United States Patent

Baer et al.

[15] 3,659,285

[45] Apr. 25, 1972

[54] TELEVISION GAMING APPARATUS AND METHOD

[72] Inventors: Ralph H. Baer, Manchester; William T. Rusch, Hollis; William L. Harrison, Nashua, all of N.H.

[73] Assignee: Sanders Associates, Inc., Nashua, N.H.

[22] Filed: Aug. 21, 1969

[21] Appl. No.: 851,865

[52] U.S. Cl. .....................340/324 A, 178/6.8, 250/217 CR, 273/85, 315/22, 315/30

[51] Int. Cl. .........................................................G08b 5/22

[58] Field of Search.....................340/324 A; 315/18, 22, 30; 328/110, 187, 189, 227, 228, 229, 231; 178/6.8; 250/217 CR

[56] References Cited

UNITED STATES PATENTS

| | | | |
|---|---|---|---|
| 2,847,661 | 8/1958 | Althouse | 315/22 X |
| 3,158,858 | 11/1964 | Ragen et al. | 340/324 A X |
| 2,595,646 | 5/1952 | Doba et al. | 340/324 A X |
| 3,189,889 | 6/1965 | Bridgett | 340/324 A |
| 3,017,625 | 1/1962 | Evans et al. | 340/324 A |
| 2,455,992 | 12/1948 | Goldsmith et al | 315/22 |
| 3,249,796 | 5/1966 | Moffitt | 315/22 |
| 3,497,760 | 2/1970 | Kiesling | 178/6.8 X |
| 3,334,236 | 8/1967 | Bacon | 250/217 CR |

*Primary Examiner*—David L. Trafton
*Attorney*—Louis Etlinger

[57] ABSTRACT

Apparatus and methods are herein disclosed for use in conjunction with standard monochrome and color television receivers, for the generation, display and manipulation of symbols upon the screen of the television receivers for the purpose of playing games, training simulation and for engaging in other activities by one or more participants. The invention comprises in one embodiment a control unit, connecting means and in some applications a television screen overlay mask utilized in conjunction with a standard television receiver. The control unit includes the control means, switches and electronic circuitry for the generation, manipulation and control of video signals representing symbols which are to be displayed on the television screen. The symbols are generated by voltage controlled delay of pulses and coincidence gating. The connecting means couples the video signals to the receiver antenna terminals thereby using existing electronic circuits within the receiver to process and display the signals. An overlay mask which may be removably attached to the television screen may determine the nature of the game to be played. Control units may be provided for each of the participants. Alternatively, games may be carried out in conjunction with background and other pictorial information originated in the television receiver by commercial TV, closed-circuit TV or a CATV station.

12 Claims, 37 Drawing Figures

INVENTORS
RALPH H. BAER
WILLIAM T. RUSCH
WILLIAM L. HARRISON
BY Richard I. Seligman
ATTORNEY

INVENTORS
RALPH H. BAER
WILLIAM T. RUSCH
WILLIAM L. HARRISON

BY Richard J. Seligman
ATTORNEY

INVENTORS
RALPH H. BAER
WILLIAM T. RUSCH
WILLIAM L. HARRISON

BY Richard I. Seligman

ATTORNEY

INVENTORS
RALPH H. BAER
WILLIAM T. RUSCH
WILLIAM L. HARRISON

BY Richard J. Seligman
ATTORNEY

INVENTORS
RALPH H. BAER
WILLIAM T. RUSCH
WILLIAM L. HARRISON

BY Richard A. Seligman

ATTORNEY

INVENTORS
RALPH H. BAER
WILLIAM T. RUSCH
WILLIAM L. HARRISON
BY Richard A. Seligman
ATTORNEY INVENTOR
RALPH H. BAER
WILLIAM T. RUSCH
WILLIAM L. HARRISON
BY Richard L. Seligman
ATTORNEY

INVENTOR
RALPH H. BAER
WILLIAM T. RUSCH
WILLIAM L. HARRISON

BY Richard A. Seligman

ATTORNEY

INVENTORS
RALPH H. BAER
WILLIAM T. RUSCH
WILLIAM L. HARRISON

BY Richard I. Seligman
ATTORNEY

INVENTORS
RALPH H. BAER
WILLIAM T. RUSCH
WILLIAM L. HARRISON

BY Richard A. Seligman

ATTORNEY

INVENTORS
RALPH H. BAER
WILLIAM T. RUSCH
WILLIAM L. HARRISON

BY Richard J. Seligman
ATTORNEY

INVENTORS
RALPH H. BAER
WILLIAM T. RUSCH
WILLIAM L. HARRISON
BY Richard J. Seligman
ATTORNEY

*INVENTORS*
RALPH H. BAER
WILLIAM T. RUSCH
WILLIAM L. HARRISON

BY Richard A. Seligman
*ATTORNEY*

INVENTORS
RALPH H. BAER
WILLIAM T. RUSCH
WILLIAM L. HARRISON
BY Richard I. Seligman
ATTORNEY INVENTORS
RALPH H. BAER
WILLIAM T. RUSCH
WILLIAM L. HARRISON
BY Richard A. Seligman
ATTORNEY INVENTORS
RALPH H. BAER
WILLIAM T. RUSCH
WILLIAM L. HARRISON
BY Richard I. Seligman
ATTORNEY INVENTORS
RALPH H. BAER
WILLIAM T. RUSCH
WILLIAM L. HARRISON
BY Richard I. Seligman
ATTORNEY

TELEVISION GAMING APPARATUS AND METHOD

REFERENCES TO RELATED APPLICATIONS

This invention relates to the subject matter of Application Ser. No. 126,966 filed Mar. 22, 1971, a continuation of Application Ser. No. 697,798 filed Jan. 15, 1968, now abandoned; and application Ser. No. 828,154 filed May 27, 1969.

BACKGROUND OF THE INVENTION

This invention relates to apparatus and methods by means of which standard television receivers can be utilized as active rather than passive instruments or, alternatively, to special television receivers constructed for active operation by participants. This is accomplished in certain embodiments by having participants manipulate controls of a control unit connected to the television receiver to cause a symbol, such as a square, or a plurality of symbols, to be displayed upon the television screen by means of which the participants can play a variety of games, participate in simulated training programs, as well as carry out other activities. By way of example, modified versions of the well-known game of ping-pong may be played by two participants by physically or electronically placing an appropriate mask representing the net upon the screen of the television receiver. Three displayed dots represent two paddles and a ball wherein the ball is moved in a particular direction when "hit" by a paddle.

Heretofore, color and monochrome television receivers have been used generally by the home and other viewers as passive devices; i.e., the television receiver is used only as a display means for programming originating at a studio. The viewer is limited to selecting the presentations available for viewing and is not a participant to the extent that he can control or influence the nature of, or add to the presentation displayed on the receiver screen.

A standard receiver employed with auxiliary equipment to provide an active form of home entertainment is described in patent applications for "Television Gaming and Training Apparatus" Ser. No. 126,966 filed Mar. 22, 1971, a continuation of Ser. No. 697,798, filed Jan. 15, 1968 and "Television Gaming Apparatus and Method" Ser. No. 828,154, filed May 27, 1969, both assigned to the assignee of this application. Since most homes are equipped with television receivers, the only expense required to provide added family enjoyment as well as training means is the expense of a control unit of one type or another.

SUMMARY OF THE INVENTION

Accordingly, it is an object of the present invention to provide apparatus and methods for displaying video signals on the screen of a television receiver, where some or all of the video signals are both generated and controlled by apparatus external to the television receiver.

It is another object of the present invention to provide an apparatus and method wherein a standard color or monochrome television receiver is utilized as an active instrument for playing various types of games involving one or more participants.

It is a further object of the present invention to provide a device whereby an individual may pit his alertness, skill, manual dexterity and visual acuity against automatically controlled video displays.

It is yet a further object of the present invention to provide an apparatus which will generate dots such as squares which may be controlled by one or more participants for playing various types of games.

It is another object of the present invention to provide a cathode ray tube apparatus for displaying symbols to be manipulated by participants.

It is yet another object of the present invention to provide an apparatus which will allow one or more participants to actively use a standard television set while receiving background and other pertinent pictorial information from a cooperative commercial TV, closed-circuit TV, or CATV station, thus combining or alternating studio and home-generated information on the TV screen.

It is still another object of the present invention to allow the use of a standard TV set for gaming or other activities without the need for any kind of internal electrical connection to the TV set for the introduction of video and/or chroma signals, connections being required to be made only to the externally accessible antenna terminals.

In accordance with one embodiment of the present invention, a television gaming apparatus is provided for generating video signals in accordance with the standardized television format, which signals may be controlled by an individual operator by means of a joystick or other manually operative means. The television gaming apparatus comprises control apparatus having included therein the necessary electronic circuits to produce video signals which are compatible with standard television receivers.

The control apparatus has video signal control means mounted thereon for easy access and connecting means are provided for coupling the video signals generated within the control box to the television receiver.

By way of illustration, the television gaming apparatus can be used for playing a game of ping-pong by providing on a TV screen two dots which represent paddles. Means are provided for enabling the players to control the vertical movement of the paddle dots. Means are also provided for generating on the screen of the television receiver a third dot which represents the ping-pong ball. This dot can be made to move from an off-screen left position to an off-screen right position and vice versa unless "hit" by a paddle dot whereupon the ball dot will change direction. The players have further controls for changing the vertical position of the ball dot.

Suitable overlays or presentations from a cooperative TV station may be used in conjunction with said games to enhance the asthetic appeal thereof. Alternatively, presentations such as a ping-pong net may be generated by controls in the hands of the participants.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Figure 1:
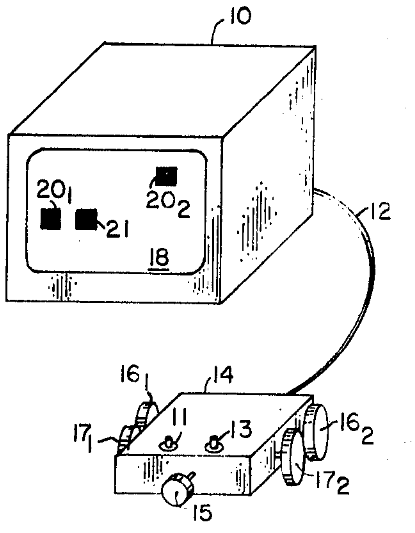
FIG. 1 is a pictorial view illustrating the principle components of an embodiment of the invention including a television receiver and a control unit.

The principal components of one embodiment of a television gaming system configured according to the invention are illustrated in FIG. 1 which is a pictorial view showing a television receiver 10, a control unit 14 and means 12 for connecting control unit 14 to receiver 10. The television receiver 10 employed can be any of the standard commercially available models that are generally used for home entertainment. Either a monochrome or color television set may be used with the present invention since the basic principles of the invention apply to both types. The connection means 12 is in this embodiment a cable, for example, shielded or unshielded twin-lead, and is attached to the antenna terminals of receiver 10 in conventional fashion.

Control unit 14 generates video signals shown as dots $20_1$, $20_2$ and 21. The dots $20_1$ and $20_2$ are positioned on the receiver screen 18 by knobs $16_1$, $17_1$, and $16_2$, $17_2$, respectively.

Knob $16_1$ controls the vertical position of dot $20_1$, while knob $17_1$ controls the horizontal position thereof. Thus, it can be seen that the dot $20_1$ many be positioned at any point on the screen by the proper manipulation of knobs $16_1$ and $17_1$. Dot $20_2$ is positioned in like manner by knob $16_2$, $17_2$. In this embodiment dot 21 can be automatically positioned on screen 18 without manual control. This will be described more fully hereinafter. A pair of serve/reset switches 11, 13 are shown on the control unit 14 and are used to reset the picture on the television screen or "serve" a simulated ball. For example, a game may be played in which one dot is to be positioned over the other and when this is accomplished one dot will disappear and/or the background will change color. When games of this nature are played, a reset means is required before play can be resumed. Serve reset switches 11, 13 can perform this function as well as other functions to be described hereafter.

A knob 15 controls background color for color TV receiver applications wherein a chroma generator is employed in the manner set forth in said application Ser. No. 126,966.

Figure 1A:
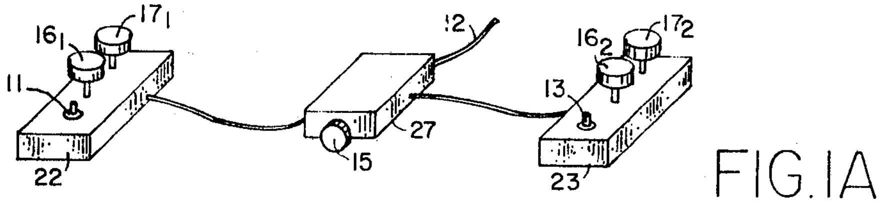
FIG. 1A is a pictorial view illustrating an alternate embodiment for the control unit of FIG. 1.

Alternatively, control unit 14 may be broken up into a master control unit containing the electronic circuits and individual control units containing control knobs $16_1$, $17_1$ and $16_2$, $17_2$ and switches 11 and 13, whereby each participant may operate from a position away from the other and so not to interfere with other players. This is illustrated in FIG. 1A wherein control unit 14 is broken up into a master control unit 27 and individual control units 22 and 23. The master control unit 27 contains the electronic circuitry found in control unit 14 and control knob 15. Knobs $16_1$, $17_1$ and $16_2$, and $17_2$ which position the dots $20_1$ and $20_2$, and switches 11 and 13 are situated on individual control units 22 and 23, respectively. More than two control units may be provided when additional participants are to take part.

For playing certain games knobs 16, 17 may be combined into a single joystick permitting control of the horizontal and vertical spot positioning by a single control means.

Other dot positioning control means (not shown) can be incorporated into the control unit(s) and these will be described hereinafter.

Rather than provide a separate control unit, the electronic circuitry of the control unit can be built into the television receiver as a constituent part thereof with control units containing the actual manipulating controls being provided as above and the receiver sold as both an active and passive home entertainment system.

A typical sequence of steps to play a game using the present invention would be as follows: 1. Attach connection means 12 to TV set 10 at the antenna terminals thereof, if not already attached; 2. turn the TV set on; 3. select the proper channel on the set for the control unit being used; 4. apply power to the control unit; 5. attach a mask on the face of the TV screen; if required for the game to be played; 6. begin the game.

Figure 2:
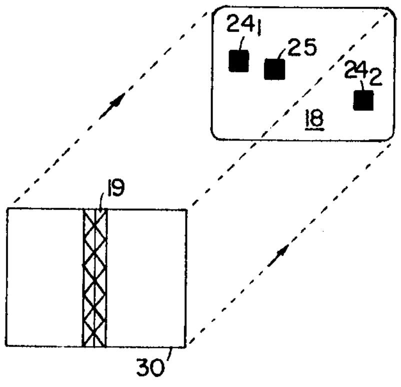
FIG. 2 is a sketch illustrating a typical TV screen and overlay mask as employed in an embodiment of this invention.

Referring now to FIG. 2, a television screen 18 is illustrated having three dots $24_1$, $24_2$, and 25 displayed thereon. Dots 24 are "hitting" dots and dot 25 is a "hit" dot. Dots $24_1$ and $24_2$ represent, for example, ping-pong paddles while dot 25 represents a ping-pong ball. An overlay mask 30 of some type of transparent material such as plastic or the like, having some type of pattern, picture or other illustration pertaining to the particular game to be played is shown in a lifted position. Prior to engaging in a game, the overlay mask 30 is temporarily attached to television screen 18 and in such close proximity to it as not to create any distortion when viewed with reference to dots 24 and 25. One type of overlay mask represents a ping-pong net 19 to be used for playing a modified game of ping-pong. Still another pattern could represent a handball or volleyball court, etc. These are but a few of the many type games that can be adapted for use with the present invention.

Alternatively, rather than employ overlay mask 30, the pattern to be provided could be displayed directly on the screen 18. The pattern can be broadcast by TV stations or alternatively can be sent to a non-used channel over closed-circuit or CATV lines. It can also be generated electronically in the video control system.

The basic theory of TV gaming devices as described herein is now set forth.

Figure 3:
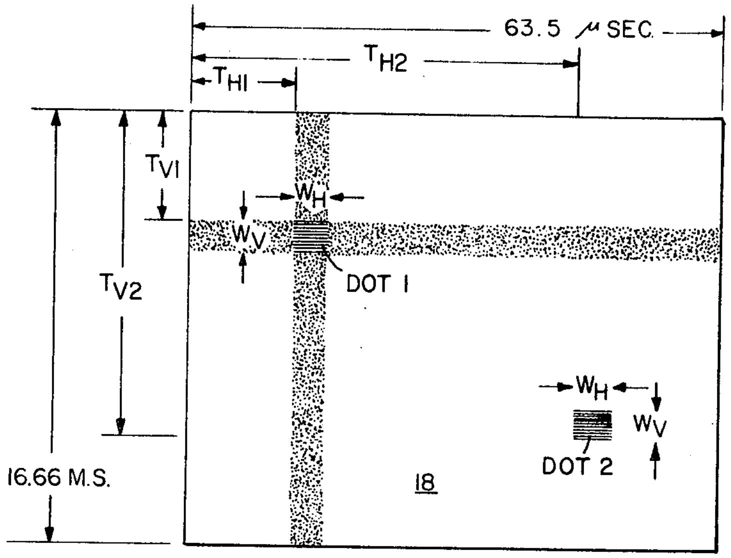
FIG. 3 is a sketch illustrating the manner in which dots are formed on a TV screen.

Referring to FIG. 3, at time zero the TV electron beam is at the upper left of screen 18. It starts moving quickly to the right and slowly downwards. Sixty-three and one-half microseconds later a 5 microsecond horizontal sync pulse is fed into the TV set, causing the beam to fly back rapidly to the left of the screen. The beam then moves to the right for 63.5 microseconds until the next horizontal sync pulse causes the next flyback to the left. After about 250 such horizontal scans (lines) the beam has progressed to the bottom of the screen. A vertical sync pulse fed into the TV set causes rapid (1 millisecond) vertical flyback to the top of the screen and another cycle begins.

Now, still referring to FIG. 3, assume that the major portion of the screen is dark (beam blanked) except for the areas shown as DOT 1 and DOT 2. The dots are made by passing a (positive) unblanking video signal to the TV set when, and only when, the "beam" is passing over the areas of the dots. (Quotes are used around beam because although there is no real beam when blanking is in effect, the scanning signals occur and can be thought of as still moving the "non-existent beam" in the scanning pattern).

The video (unblanking) signals required for dot generation are described with the aid of FIG. 3. To derive DOT 1, assume that a pulse of width $W_H$ is generated $T_{H1}$ microseconds after the occurrence of each horizontal sync pulse. Define these new pulses as $P_{H1}$ — horizontal video pulse for DOT 1. If these $P_{H1}$ pulses were used as unblanking (video) in the TV set, the beam would brighten whenever it had moved a distance equivalent to $T_{H1}$ from the left side of the screen. It would stay bright for a length equivalent to $W_H$ and then darken. This would happen all during the vertical scan and 250 bright little line segments of width $W_H$ would appear to the eye as a vertical column (shown shaded in FIG. 3).

Now, DOT 1 vertical video pulses $P_{V1}$ are made to be of width $W_V$ and to occur $T_{V1}$ milliseconds after the start of the vertical sweep. $W_V$ is on the order of 635 microseconds, permitting some ten horizontal scans to take place while $P_{V1}$ is on. If $P_{V1}$ were used alone as the unblanking (video) signal to the TV set, ten lines the width of the set would be brightened while $P_{V1}$ was on and a bright horizontal bar of width $W_V$ (shown shaded in FIG. 3) would be viewed.

As the last step in dot generation, dot 1 horizontal video pulses ($P_{H1}$) and vertical video pulses ($P_{v1}$) are passed through a coincidence gate. The gate has an output only when both $P_{H1}$ and $P_{V1}$ are on. The gate output becomes DOT 1 video (unblank) signal. From FIG. 3 it is obvious that the beam is now unblanked only where the $P_{H1}$ vertical shaded column and the $P_{V1}$ horizontal shaded bar overlap. Thus, a bright dot DOT 1, comprised of about 10 small line segments, each $W_H$ wide, is developed. DOT 2 is developed in the like manner.

Figure 4:
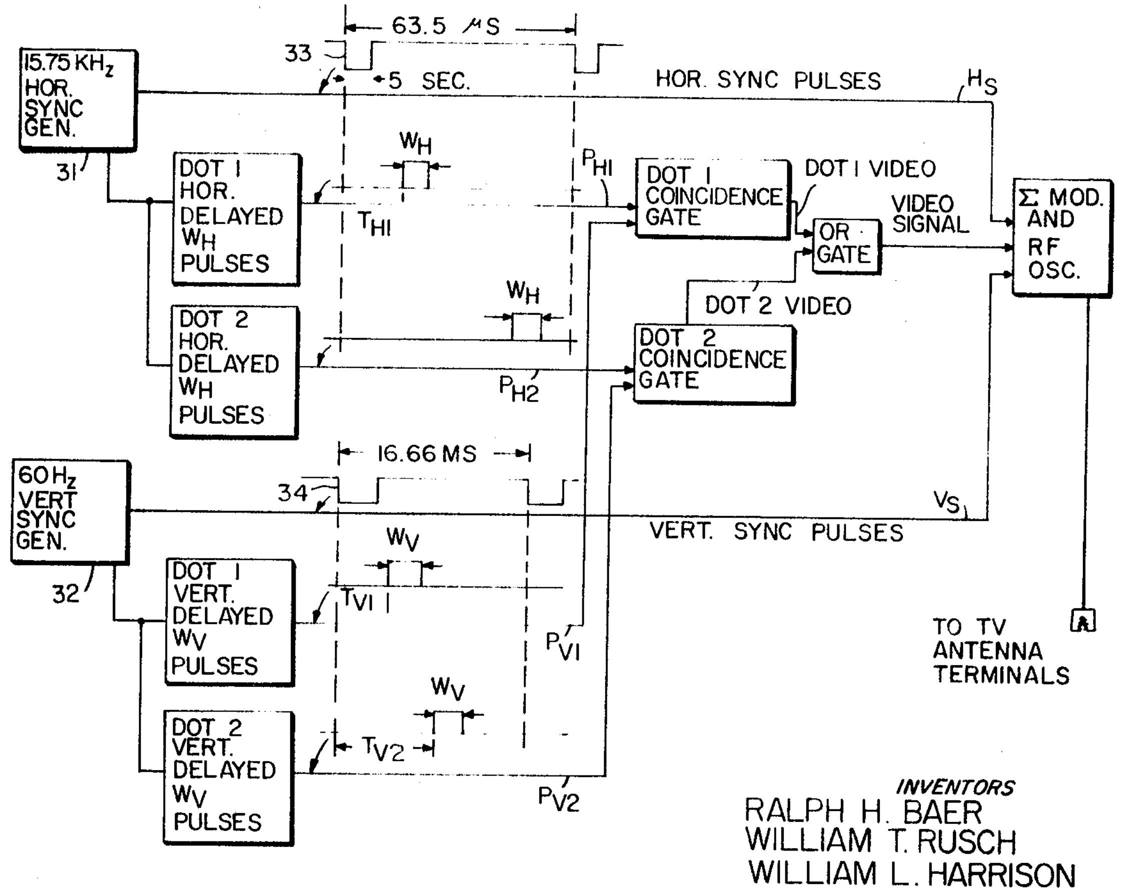
FIG. 4 is a block diagram illustrating the general theory of dot generation.
Figure 5:
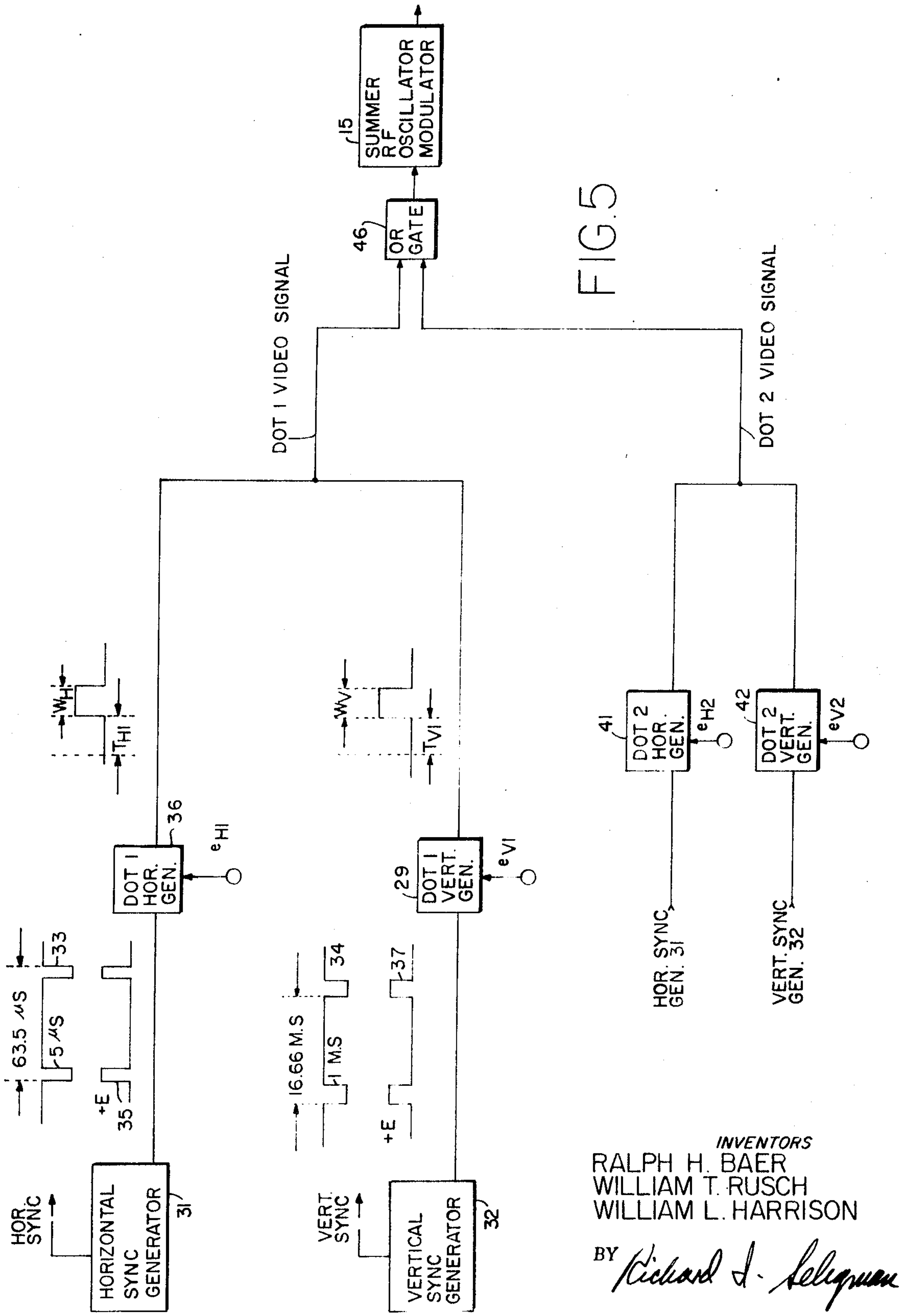
FIG. 5 is a block diagram of the preferred mode of generating dots on a TV screen.

FIGS. 4 and 5 are block diagrams illustrating the manner in which the signals discussed with respect to FIG. 3 are generated.

The timing for the television gaming system is established by a horizontal sync generator 31 and a vertical sync generator 32. The horizontal sync generator 31 generates a series of negative horizontal sync pulses 33 having a repetition rate equivalent to the standard horizontal scanning frequency used in the United States commercial television receivers and the vertical sync generator generates a series of negative vertical sync pulses 34.

The horizontal sync generator 31 also generates a 15.75 KHz positive pulse train 35 (refer now to FIG. 5). The pulses of pulse train 35 have end limits of +E and O. It is directly coupled to a DOT 1 horizontal generator 36. By varying voltage $e_{H1}$, delay $T_{H1}$ can be varied for spot positioning from left to right of the TV screen.

A 60 Hz pulse train 37 is generated by vertical sync generator 32 and is similarly applied to a DOT 1 vertical generator 29 to give width $W_V$ and voltage controlled delay $T_{V1}$.

The dot generators are described in detail below in conjunction with the schematic of FIG. 7A. The two outputs from the dot generators are tied together and provide the video signal for DOT 1. In the general case illustrated in FIG. 4, a coincidence gate is shown coupling the vertical and horizontal pulses for each dot to be displayed. However, in the embodiment of FIG. 5, no coincidence gate is required. This will be explained when the detailed description of the dot generators is set forth hereinafter.

Other dots are generated in similar fashion. For example, DOT 2 horizontal generator 41 is also coupled to the horizontal sync generator 31 and DOT 2 vertical generator 42 is also coupled to vertical sync generator 32. The horizontal and vertical generators 41 and 42 are tied together. All video dot signals are fed to an OR gate 46. The OR gate prevents excessive brightening when dots are positioned on top of one another.

The output from OR gate 46 is applied to a summer which sums all the signals presented thereto (including sync pulses from the horizontal and vertical sync generators, outputs from a chroma generator, if used, etc.). This forms the composite video signal. This signal is applied to a modulator and RF oscillator for modulating the video information with the RF carrier to generate the requisite modulated RF signal which is coupled to the TV antenna terminals. The RF signal presented to the antenna terminals is detected and processed by the TV receiver in the standard manner and displayed on the screen thereof.

Figure 6:
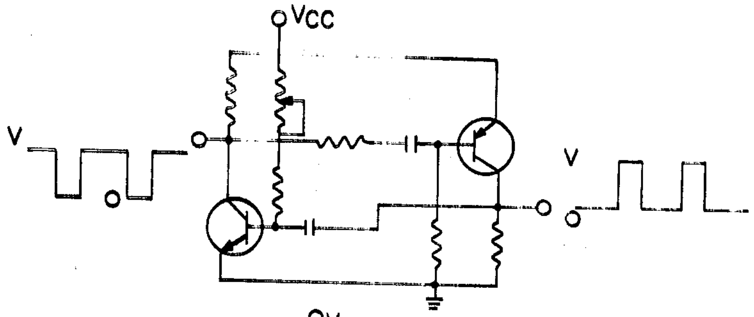
FIG. 6 is a schematic of a sync generator employed in the embodiment of FIG. 5.

Referring now to FIG. 6, there is illustrated one embodiment of the sync generators. The vertical and horizontal sync generators are constructed in the same fashion, however, components values are changed in order to get the appropriate timing and pulse widths. For United States commercial television receivers the horizontal sync generator generates a 15.75 KHz pulse train and the vertical sync generator generates a 60 Hz pulse train. For other systems, especially, in foreign countries or in closed circuit applications different frequencies can be employed. As you will note the sync generator comprises an astable multivibrator with one side of the multivibrator comprising a PNP transistor and the other side an NPN transistor. In this manner, the quiescent current is kept very low except during the time when sync pulses are actually being generated. This increases the efficiency of the unit and extends battery life, if a battery is employed. A feature of this arrangement is that you get both positive and negative sync pulses with respect to each other and both act as low impedance sources during sync pulse generation times.

Figures 7A, 7B:
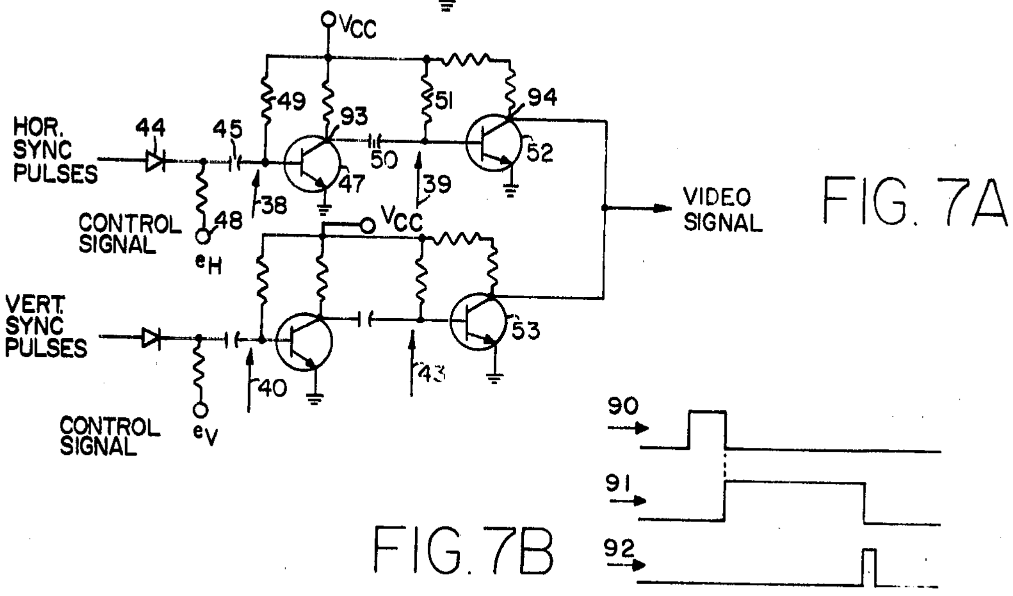
FIG. 7A is a schematic of a dot generator employed in the embodiment of FIG. 5.
FIG. 7B are waveforms illustrating operation of the circuit of FIG. 7A.

Referring now to FIG. 7A there is illustrated thereby one embodiment of the dot generators employed in the present TV gaming system. The dot generator illustrated comprises two sections, a horizontal section which provides the horizontal portion of the video signal and a vertical section which provides the vertical portion of the video signal. The horizontal section comprises two delay circuits 38, 39. Delay circuit 38 provides the appropriate horizontal positioning of the horizontal portion of the video signal; that is, at what place horizontally on the television screen will the generated symbol appear. The second delay circuit 39 sets the horizontal dot size.

Horizontal sync pulses from horizontal sync generator 31 pass through a diode 44 and charge a capacitor 45 through the base of a transistor 47. Capacitor 45 charges up to the voltage of the sync pulse. The capacitor 45 then discharges to the level of the voltage at point 48, the voltage at point 48 being the control signal $e_H$. By varying control signal $e_H$ from ground to 6 volts, the horizontal position of the displayed dot will go from one off-screen position to the opposite off-screen position. The voltage at the base of transistor 47 will drop to minus the voltage at point 48 and then discharges back to ground through a resistor 49. Transistor 47 is cut-off right after the input sync pulse extinguishes. The time constant components in the delay circuit 38, comprising a capacitor 45 and a resistor 49, are constant; however, the amount of discharge from capacitor 45 determines the horizontal screen position of the dot. A capacitor 50 and a resistor 51 determine the dot size. These components are generally fixed for most applications.

Typical waveforms from the dot generator are illustrated in FIG. 7B. Waveform 90 is the input sync pulse. Waveform 91 is taken at a point 93. It begins at the negative going portion of the sync pulse and has a width which is controlled by the $e_H$ control signal. The negative going edge of this pulse determines dot position (at what time the pulse 92 is generated).

The stages 38 and 39 could each be replaced by one shot multivibrators. However, this would be more expensive since two transistors would be required for each one shot multivibrator.

The vertical portion of the dot generator is constructed in like fashion, comprising a pair of delay circuits 40 and 43. The horizontal and vertical portions of the dot generator are anded together by typing together the collectors of a pair of transistors 52, 53. An output from the dot generator can be obtained only when both transistors 52 and 53 are off; therefore, in the event we wish to display, for example, a horizontal or vertical bar requiring only vertical or horizontal video information, the connection between transistor 52 and 53 must be broken; that is, we must disconnect the collector tie.

The dot generators just described can be used as a "hitting" dot simulating a paddle for a ping-pong game, hand for a handball or volleyball game, etc. This dot generator also can be used as a "hit" dot generator simulating a ball, for example. The use of the dot generator depends to a great deal upon the $e_H$ and $e_V$ control voltages applied thereto and there manner of generation.

FIG. 8 illustrates certain of the control voltage generating schemes employed in many of the gaming devices to be described hereinafter.

Figure 8A:
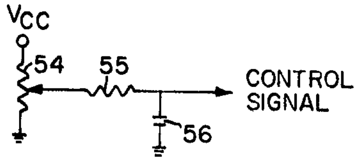
FIGS. 8A–8C are schematics of controls used to generate control signals for the dot generator of FIG. 7.

FIG. 8A is one voltage control circuit and comprises a potentiometer 54, a resistor 55 and a capacitor 56. The potentiometer 54 is varied to provide the desired control voltage. The RC time constant of the resistor 55 and capacitor 56 is constant and provides a sluggish movement of the dot to simulate the manner in which for example a paddle would be swung or a ball moved. If the RC time constant were eliminated then the dot would move from one position to the next almost instantly and could not be easily followed and would make game playing difficult.

In the simulated game of ping-pong, to be described hereinafter, a control as set forth in FIG. 8A is applied as the $e_V$ control to each paddle dot generator. The $e_H$ control is fixed at a preset voltage such that the paddles may move only up and down but maintain the same respective horizontal position. Control 54 may be manipulated by a knob or in certain games may be part of a mechanism, such as a joystick.

In certain games such as volleyball, ping pong, and handball, a wall or net is required and this is achieved by merely applying a fixed horizontal voltage to the horizontal portion of one dot generator, the vertical portion thereof being disconnected, as described above.

Figure 8B:
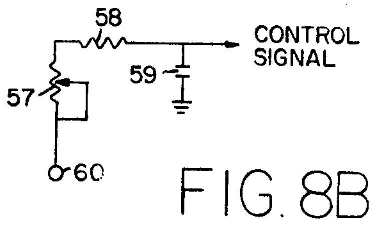

A second ball control scheme is illustrated in FIG. 8B and comprises a potentiometer 57, resistor 58 and a capacitor 59. This voltage control is an RC circuit, the R comprising variable resistor 57, and fixed resistor 58 and the C capacitor 59. The signal applied to point 60 is generally either 6 volts or ground. This is a ball dot control signal. The ball will go from one horizontal off-screen position to the opposite horizontal off-screen position depending upon whether the signal applied at point 60 is ground or 6 volts. The signal to be applied at point 60 is derived from flip-flop circuits to be described hereinafter.

Figure 8C:
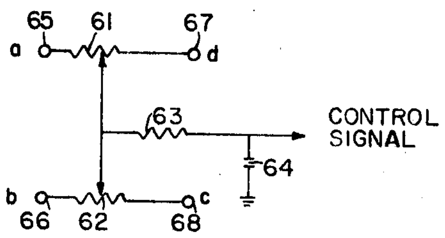

The control signal of FIG. 8C, herein designated as the "English" control, comprises a pair of potentiometers 61, 62, a resistor 63, and a capacitor 64. Only one of these potentiometers is in the circuit at any one time. Points 65 through 68 are connected to a primary flip-flop which places in and takes out of the circuit one of the potentiometers. This control signal is applied to the vertical control of a ball dot and permits changing the vertical position thereof. For example, in a game of ping-pong, the paddle dots hit the ball dot between two respective off-screen positions unless the ball is coincident with the opponents paddle whereby the ball will reverse direction. Provisions are provided by the control signal means of FIG. 8C such that once a player hits the ball and it moves toward his opponent's paddle, the player then has a control, either potentiometer 61 or 62, to control the vertical position of that ball as it moves toward his opponent. All of this will be described in greater detail when setting forth a simulated ping-pong game.

Figure 9:
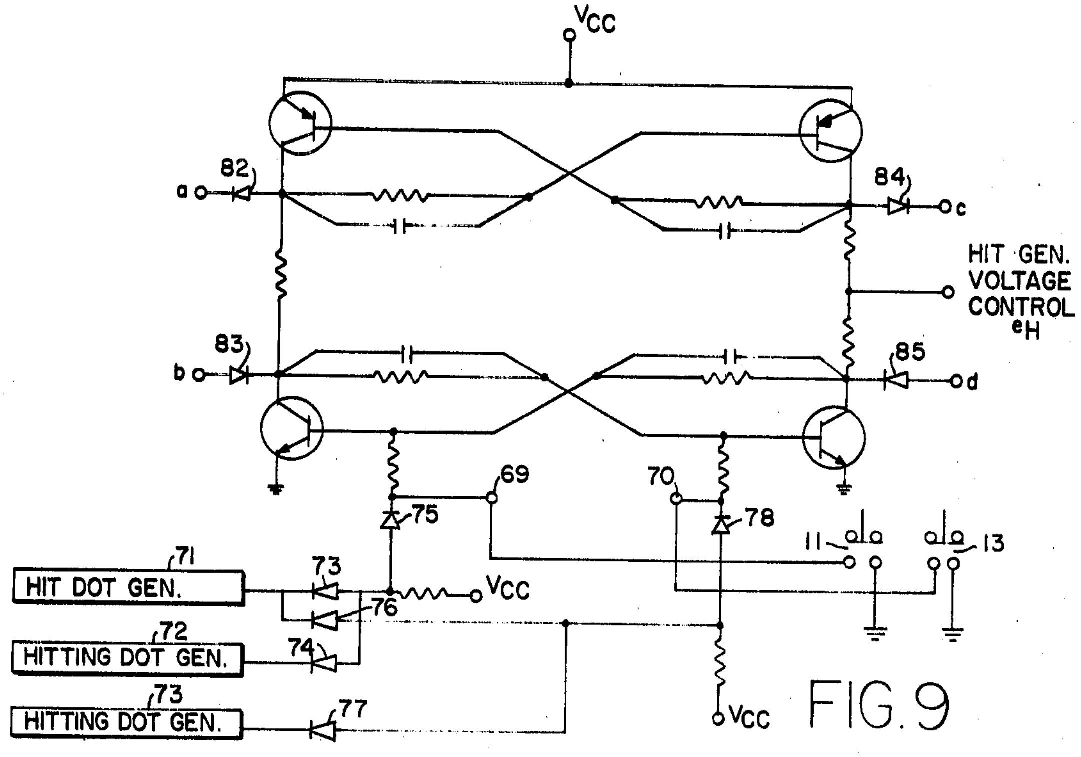
FIG. 9 is a schematic of a primary flip-flop arrangement used in many of the gaming applications.

Referring now to FIG. 9 there is illustrated thereby what will be designated hereinafter as the primary flip-flop circuit. This flip-flop circuit provides the voltage control for a "hit" dot generator, for example, a simulated ball. This primary flip-flop provides the horizontal control voltages to the "hit" dot generator, for example, by providing the control voltage to point 60 of the control illustrated in FIG. 8B. The horizontal control voltages will move a "hit" dot from an off-screen position on one side of the screen towards an off-screen position on the other side of the screen each time the flip-flop changes state. The state of the flip-flop also determines which of the two potentiometers 61, 62 (see FIG. 8C) has control of the vertical position of the "hit" dot. Triggering for the primary flip-flop is as follows. The triggering signals are applied at points 69 and 70. Upon coincidence of a "hit" dot and one of the "hitting" dots, the primary flip-flop will change state. For example, if a "hit" dot from dot generator 71 is coincident with a "hitting" dot from dot generator 72, a coincident circuit comprising a pair of diodes 73 and 74 will provide a trigger pulse to point 69 via a diode 75 thereby causing the flip-flop to change state. In like fashion, coincidence between a "hit" dot from dot generator 71 and a "hitting" dot from dot generator 73 will provide via diodes 76, 77 a trigger pulse via diode 78 to point 70. Coincidence will occur, for example, in a simulated game of ping-pong when the ball and paddle are coincident. Upon coincidence between a paddle of one player and the ball, the ball will change horizontal direction and move towards the opposite side of the screen of the television receiver. At the same time, the flip-flop switching will cause diodes 82 through 85 to be appropriately biased thereby selecting the horizontal control potentiometer (English control see FIG. 8C) of the player whose paddle makes coincidence with the ball to control the vertical position of the ball as it approaches the opponent's paddle. In the event that a player does not make coincidence between a "hit" and "-hitting" dot the dot will go off-screen and remain there, and must be reset. This is accomplished by one of the serve/reset switches 11, 13 which will serve the ball towards the opponent's paddle by causing the primary flip-flop to change states.

Figure 10:
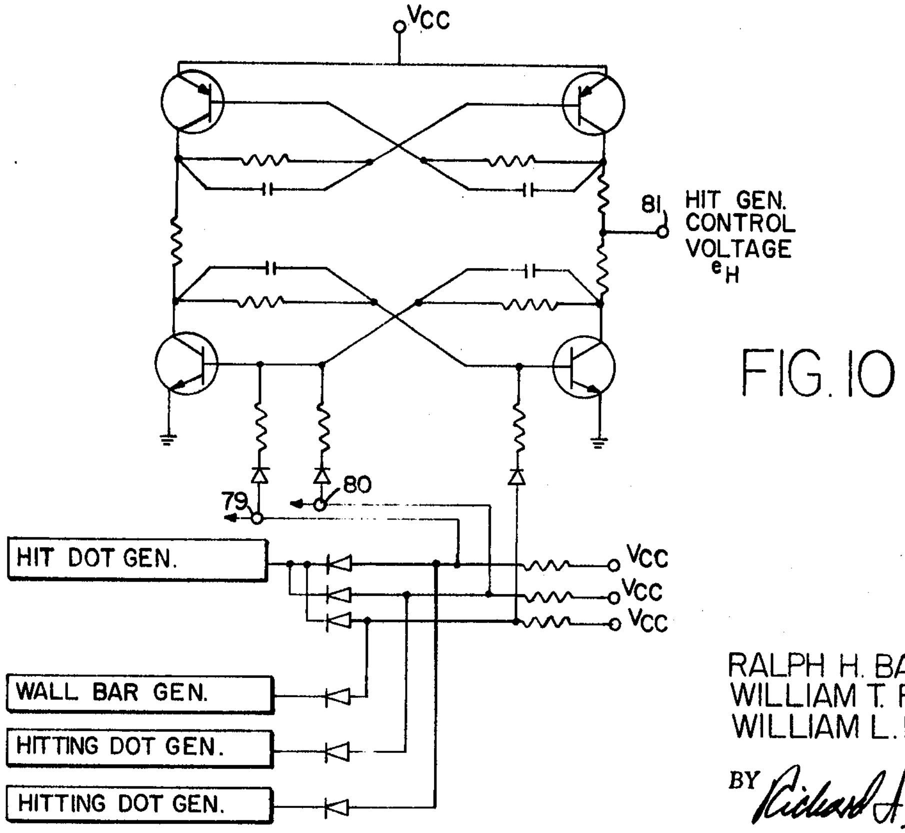
FIG. 10 is a schematic of a secondary flip-flop arrangement used in certain ones of the gaming applications.

Referring now to FIG. 10, there is illustrated thereby what will be designated as the secondary flip-flop. This circuit arrangement is used in games wherein both players have their "-hitting" dots displayed at one end of the screen such as in a simulated handball game, and where at the other end of the screen there is situated, for example, a wall, and where it is desired that upon coincidence between the wall and the "hit" dot, that the "hit" dot be returned toward the players. Accordingly, this flip-flop is put into one state by coincidence between either of the "hitting" dots and the "hit" dot and put into the alternate state by coincidence between a dot from a "-hit" dot generator and the output from the wall symbol (bar or line) generator. The output 81 from this secondary flip-flop arrangement supplies the horizontal control voltage for the "-hit" dot generator. In order to provide which "English" control potentiometer (see FIG. 8C) will be in the circuit, the points 79 and 80 of the secondary flip-flop are connected to the primary flip-flop at the trigger inputs thereto, namely, at the anodes of the diodes 75, 78, respectively. The serve function which is employed in the event the player fails to make coincident between his "hitting" dot and the "hit" dot is accomplished in the manner described above by the serve/reset switches 11 and 13.

In order to better explain the manner in which the various electronic functions previously described are employed, some exemplary games are now set forth in greater detail.

Figure 11A:
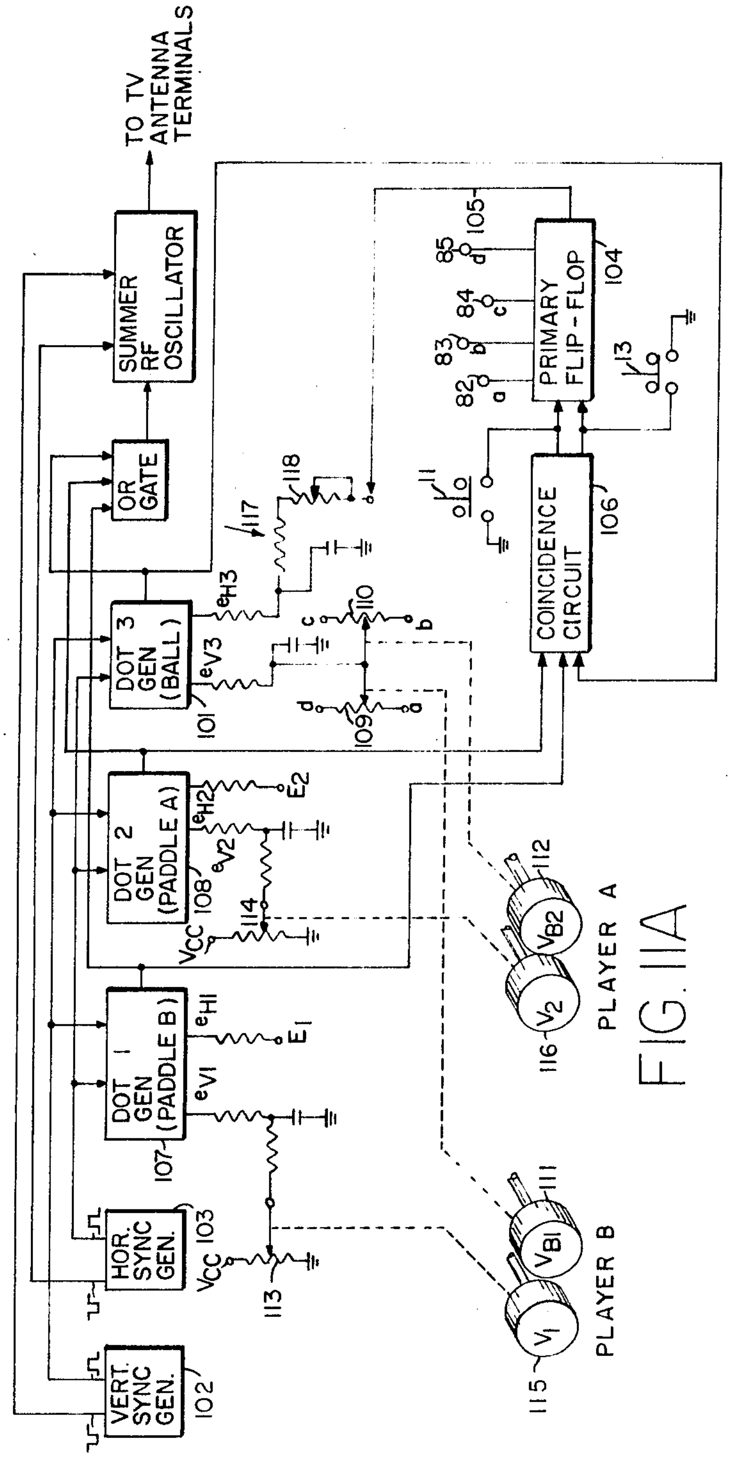
FIG. 11A is a diagram of apparatus for a simulated ping-pong type game.
Figure 11B:
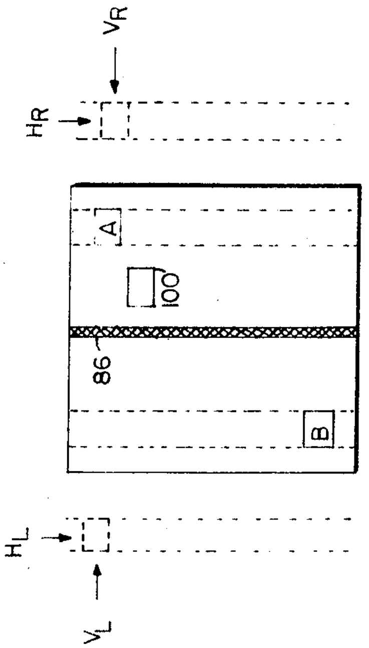
FIG. 11B is a sketch of a television screen illustrating the manner of play of the ping-pong game of FIG. 11A.

One class of games is represented by a simulated ping-pong game and this is illustrated in FIGS. 11A and 11B.

A simulated ping-pong ball 100 is generated by dot 3 generator 101 which has inputs thereto from a vertical sync generator 102 and a horizontal sync generator 103 (of the type set forth in FIG. 6). The dot generators are similar to those set forth in FIG. 7. The horizontal control voltage for dot 3 generator 101 is derived from a primary flip-flop 104 of the type described in FIG. 9. Primary flip-flop 104 provides horizontal control voltage at an output 105 which moves the ball 100 between off-screen positions $H_L$ and $H_R$. Primary flip-flop 104 is controlled by coincidence circuitry 106 and serve/reset switches 11, 13 in the manner set forth in FIG. 9. In one state flip-flop 104 will serve the ball from off-screen left to off-screen right and in the other state from off-screen right to off-screen left. The output from coincidence detector 106 is used to switch flip-flop states when the ball is hit by one of the two simulated paddles. The serve/reset switches are used to cause the flip-flop to switch when a paddle "misses" the ball and must be served on-screen.

The inputs to coincidence detector 106 are the DOT 1 (paddle A) video pulse, the DOT 2 (paddle B) video pulse and the DOT 3 (ball 100) video pulse which are derived from the respective dot generators 107, 108 and 101.

The $V_R$ and $V_L$ positions of ball 100 are controlled by players A and B, respectively, by adjustments of potentiometers 109, and 110 via knobs 111 and 112, respectively.

The vertical positions of paddles A and B are determined by the setting of potentiometers 113 and 114 which provide the vertical control voltages to the DOT 1 and DOT 2 generators 107, 108, respectively. Knobs 115 and 116 operate the potentiometers 113, 114. The horizontal positions of paddles A and B may be similarly controlled by control knobs to supply voltages $E_1$ and $E_2$ via a circuit like that of FIG. 8A.

This simulated ping-pong game is played as follows.

The ball 100 is connected, with an RC time constant 117 to primary flip-flop 104 which moves the ball between off-screen positions $H_L$ and $H_R$. The RC time constant prevents instantaneous spot motion. A potentiometer 118 is provided to change the RC time constant 117 to make the ball move faster or slower, depending upon the skill of the players.

Assume the ball is at $H_L$, it is "served" by pushing serve/reset switch 13. The ball proceeds toward $H_R$. Player A moves paddle A vertically (by turning knob 116 connected to potentiometer 114) to try to hit the ball. If he misses it he loses a point as it goes off-screen right where it will remain until "-served" by actuating switch 11.

However, if player A hits the ball, it bounces off his paddle and starts left toward $H_L$. Now player A has control of its flight, and by adjusting $V_L$ with his other hand (by turning knob 112 connected to potentiometer 110) he can send the ball up or down and even try to "wiggle" it around player B's paddle.

Player B controls the vertical motion of paddle B (by turning knob 115 connected to potentiometer 113) and, if he hits the ball, gains control of its path by adjusting $V_R$ (by turning knob 111 connected to potentiometer 109).

When color is used, the ball and paddles are preferably white and the "table" green. Overlays or TV or CATV backgrounds showing a lined table and net 86 enhance the effect. The game cam be played by two man teams. One man controls the paddle, the other man the path of the ball. Another dot generator with only a horizontal section can be provided to generate a vertical bar 86 simulating the net.

By modification of the embodiment of FIG. 11, a game of gun ping-pong can be played. In this embodiment the players use light sensor guns instead of paddle dots to hit the ball back and forth. An output from the light sensor is used to trigger flip-flop 104 instead of coincidence detector 104. The control knobs 115 and 116 are not required. Whereas, it is difficult for one man to aim a gun and control a potentiometer, the game is best with two man teams. One man shoots, opponent controls the ball's path.

Figure 12A:
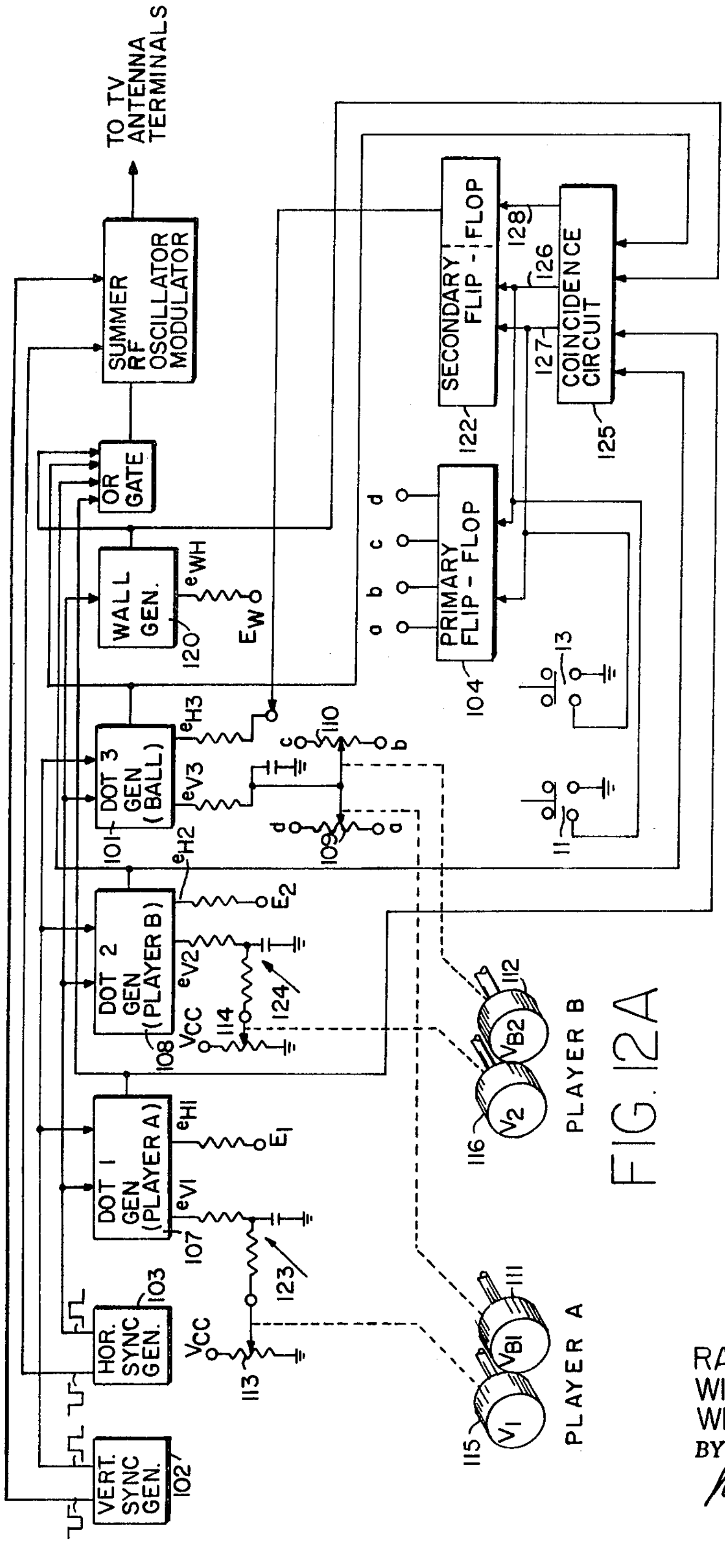
FIG. 12A is a diagram of apparatus for a simulated handball type game.
Figure 12B:
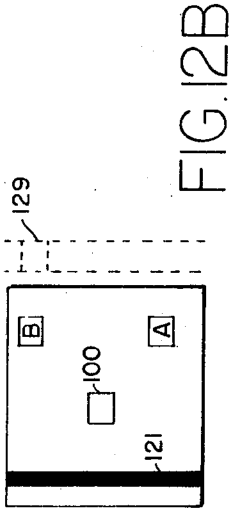
FIG. 12B is a sketch of a television screen illustrating the manner of play of the handball game of FIG. 12A.

Referring now to FIGS. 12A and 12B, there is illustrated thereby a simulated handball game. The principal components of the handball game are a vertical sync generator 102, a horizontal sync generator 103, DOT 1 and DOT 2 generators 107, 108 which represent respectively players A and B, a DOT 3 generator 101 which represents a ball 100, a wall generator 120 which provides on the screen a vertical column which represents a wall 121, an OR gate and a summer RF oscillator and modulator, all of the type previously described. Other principal components of the simulated handball game are a primary and a secondary flip-flop of the types described in FIGS. 9 and 10, respectively, coincidence circuitry also of the type set forth in FIGS. 9 and 10, a pair of serve/reset switches 11 and 13 and various control voltage generating devices of the types previously set forth.

The vertical position control for the DOT 1 generator 107 comprises a potentiometer 113 followed by an integrating circuit 123 which permits the vertical position of player A to be changed. The horizontal position of player A is fixed and provided by a DC potential $E_1$. In like fashion the vertical position control for player B is determined by a potentiometer 114 followed by an integrator 124. The horizontal position of DOT 2 or player B is determined by another DC potential $E_2$.

The vertical position control of the ball is determined by a pair of potentiometers 109, 110 in the manner previously described with respect to the ping-pong game of FIG. 11 whereby either potentiometer 109 or potentiometer 110 is applied to the $e_{V3}$ input of the dot 3 generator 101. The primary flip-flop 104 determines which potentiometer is coupled into the vertical voltage control for the DOT 3 generator depending upon which player last "hit" the ball (was coincident with the ball). The horizontal position of the ball is determined by the output from a secondary flip-flop 122 in the manner described in FIG. 10. Coincidence between the wall 121 and the ball 100 will switch the secondary flip-flop causing the ball to be returned toward the right hand side of the screen. Coincidence between either player A or B and the ball will cause the ball to move toward the wall 121. In the event that the ball, when moving from left to right, does not coincide with either player A or B, it will go off-screen and remain their until reset by one of the serve/reset switches 11 and 13.

Coincident circuit 125 is very similar to the coincident circuit 100 previously described, however, it has further capability of providing coincidence not only between a player and the ball but also between the wall and the ball. Upon coincidence between player A and the ball, an output is derived from line 126. Upon coincidence between player B and the ball, an output is derived from line 127. Upon coincident between the wall and the ball, an output is provided at line 128. Lines 126 and 127 are both connected to one side of the secondary flip-flop and line 128 is connected to the other side thereof. The lines 126 and 127 also go to different sides of the primary flip-flop to provide the requisite switching for the potentiometers 109, 110.

The handball game illustrated in FIGS. 12A and 12B is played as follows.

Initially the ball is served by, for example, player A pressing serve/reset button 11 which will cause the ball to move from an off-screen right position, for example, position 129 toward the wall 121. Upon coincidence with the wall 121, the coincidence circuit 125 via line 128 will cause secondary flip-flop 122 to apply the appropriate horizontal control voltage $e_{H3}$ to the DOT 3 generator 101 causing the ball to move from left to right. At this time, player A, who has originally served the ball, will have his "English" potentiometer 109 connected in the vertical control circuit for the ball and, therefore, can move the ball 100 in a vertical fashion as the ball is moving from left to right. Player B, meanwhile, will attempt to move his dot B, by rotating knob 116, to make coincidence with the ball 100. If he does not make coincidence with the ball, then the ball will go off-screen and must be served again by one the serve/reset buttons. However, if he does make coincidence with the ball, this will be denoted by coincidence circuit 125 and an output along line 127 will be applied to the secondary flip-flop causing the ball to move from right to left. At the same time, the primary flip-flop 104 provides appropriate outputs to connected player B's "English" potentiometer in the vertical control circuit for the ball, thereby giving player B vertical control thereof.

Figure 13A:
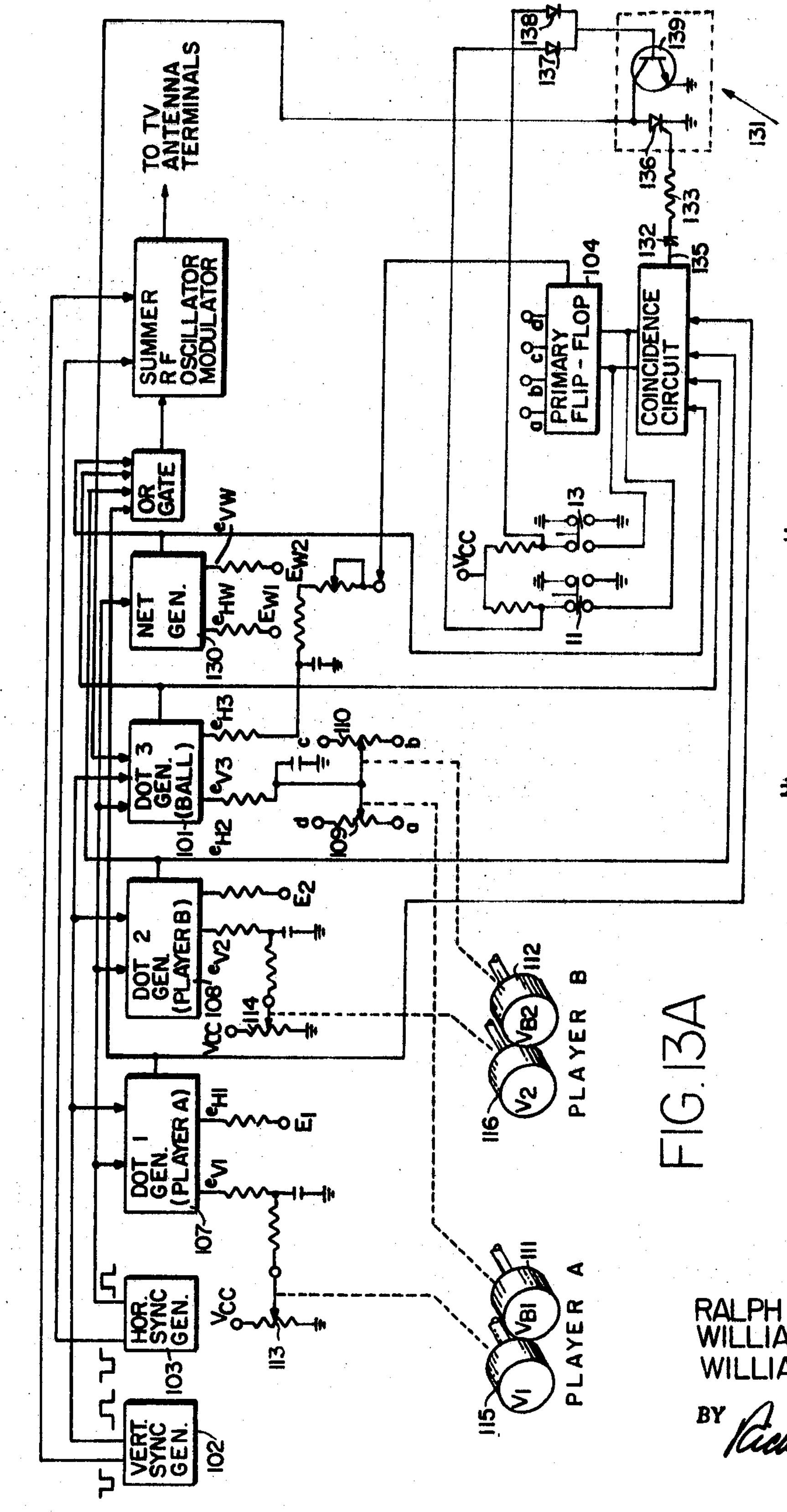
FIG. 13A is a diagram of apparatus for a simulated volleyball type game.
Figure 13B:
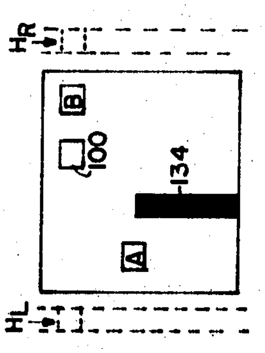
FIG. 13B is a sketch of a television screen illustrating the manner of play of the volleyball game of FIG. 13A.

The diagrams of FIG. 13A and 13B illustrate a volleyball type game which can be played employing the principles set forth in this application. As with the games previously described, a pair of dot generators 107 and 108 which receive their inputs from vertical and horizontal sync generator 102 and 103, respectively, provide DOTS A and B which represent the two players in the game. A third generator 101 represents the ball 100. A fourth generator 130 provides a net 134. This net is different from the wall 121 previously described with respect to FIG. 12B in that it is positioned in the middle of the screen and does not extend the full vertical length of the screen. The horizontal positioning of the net is accomplished in the same manner as previously described by applying a voltage $E_{H1}$ to the control input to the horizontal portion of a dot generator of the type illustrated in FIG. 7. In this net generator a vertical circuit is also included in order to limit the vertical height of the wall 134. This is accomplished by applying a second dc voltage $E_{H2}$ to the vertical portion of this dot generator. What occurs is that the vertical width of the signal is increased much greater than previously used when displaying dots. This is done by eliminating the time constant components 43 from the vertical portion of the dot generator. This game is played very much like the ping-pong game previously described where players A and B hit the ball 100 back and forth. In the event the ball goes off-screen it is reset in the manner previously described. Each player has a vertical control for moving the respective player in a vertical movement. Each player also has controls for changing the vertical position of the ball 100, namely potentiometers 109 and 110 operated by knobs 111 and 112. Which potentiometer is in the circuit at any one time is determined in the same manner described above using primary flip-flop 104 which receives outputs from a coincident circuit denoting coincidence between the ball and players. This game differs from the ping-pong game primarily in that a player will lose a point if he hits the net 134. This is determined by using a crowbar circuit 131. When coincidence between the net 134 and ball 100 occurs a signal is obtained from the coincident circuit along line 135 and is applied via a diode 132 and resistor 133 to an SCR 136 of a crowbar circuit 131. The SCR will thereby fire with the output therefrom, taken at the anode, being applied to the ball generator 101 grounding the output therefrom and, thus, causing the ball to disappear from the screen. The ball is made to reappear on the screen by pressing one of the serve/reset buttons 11, 13 whereby the opposite poles thereof are connected through a pair of diodes 137, 138 into the crowbar circuit and via a transistor 139 to the anode of the SCR 136 thereby shutting same off.

Figure 14A:
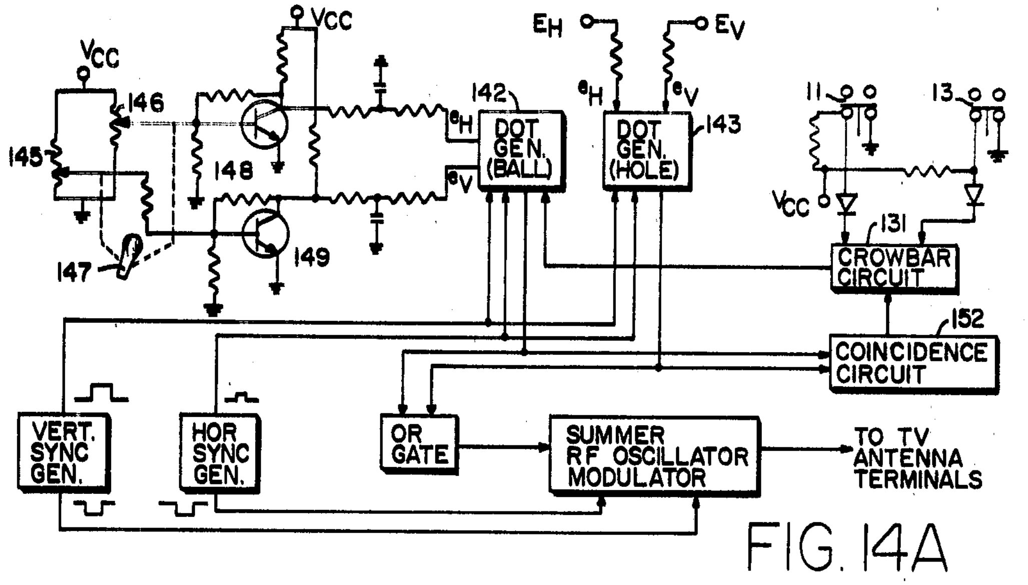
FIG. 14A is a diagram of electronic apparatus for a simulated golf putting game.
Figure 14B:
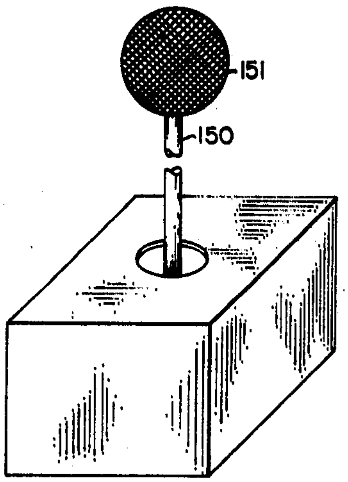
FIG. 14B is a sketch of the input control for the apparatus of FIG. 14A.
Figure 14C:
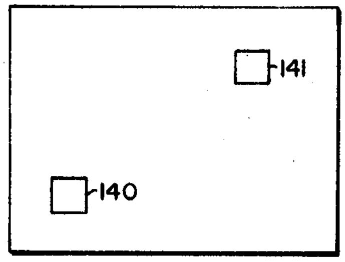
FIG. 14C is a sketch of a television screen illustrating the manner of play of the golf putting game of FIG. 14A.

Referring now to FIG. 14A, there is illustrated thereby a simulated golf putting game. The object of this golf game is to hit a simulated ball 140 into a hole 141. Suitable overlays may be provided over the screen in order to make the game more realistic by making the screen look more like a putting green. The overlays may also be applied by broadcast TV or closed circuit TV OR CATV or electronic displays. The principal components of this game are a first dot generator 142 for generating the ball dot 140 and a second dot generator 143 for generating the hole 141. The dot generators have inputs from the vertical and horizontal sync generators. The outputs of the dot generators are coupled via an OR gate to the summer, RF oscillator and modulator in conjunction with the vertical and horizontal sync pulses. The dot generator 143 has as its control voltage inputs DC levels to position the hole 141 on the screen. If desired, the position of the hole may be changed by merely changing the respective $E_H$ and $E_V$ voltages. The dot generator 142 control voltages are derived from a pair of potentiometers 145, 146 which are ganged together on a joystick 147 with the output therefrom being applied via respective amplifiers 148, 149 to the voltage control inputs of the dot generator 142. Amplifiers may be eliminated by special construction of the joystick coupling to the potentiometers so as to produce a larger voltage swing directly from the potentiometers. In one embodiment of this game, a shaft 150 is mounted to the joystick 147 and arranged at the top of the shaft 150 is a golf ball 151 (see FIG. 14B). The game is played by hitting the golf ball 151 with, for example, a putter, to attempt to move the dot 140 toward the hole 141. If coincidence is made between the dots 140 and 141, coincidence circuit 152 will apply an output to a crowbar circuit 131 to cause the dot 140, representing the ball, to disappear. Crowbar circuit is reset in conventional fashion as described previously by serve/reset buttons 11 and 13.

Figure 15A:
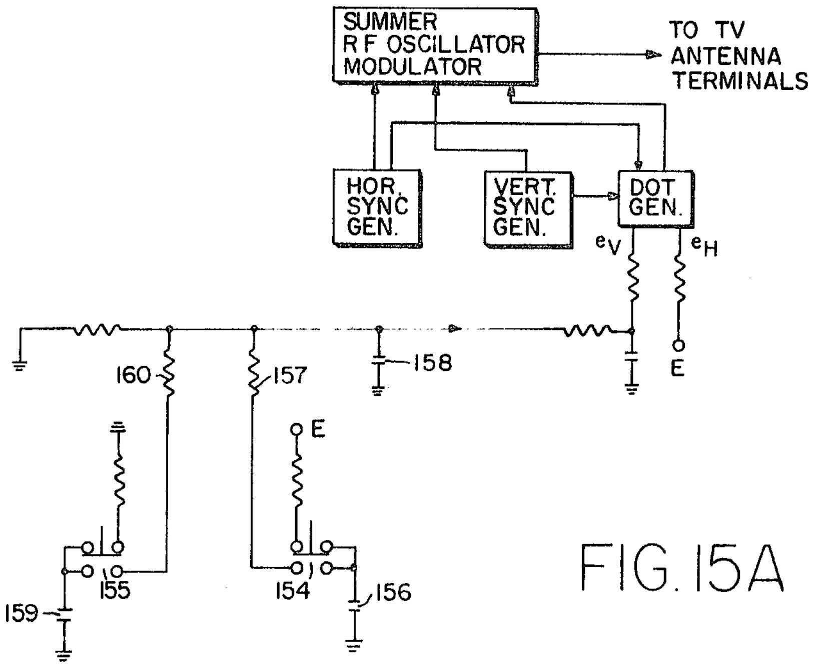
FIG. 15A is a diagram of apparatus for a "pumping" game.
Figure 15B:
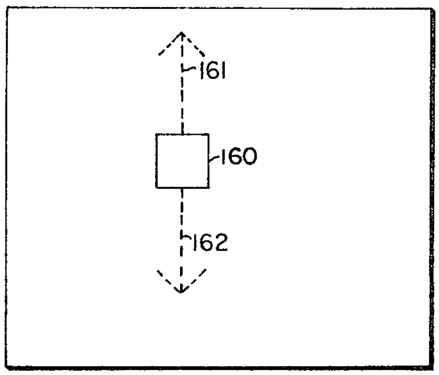
FIG. 15B is a sketch of a television screen illustrating the manner of play of the "pumping" game of FIG. 15A.

FIGS. 15A and 15B illustrate a very simple game which can be played employing the concepts of the invention. This game is particularly adaptable for play by small children. Referring to FIG. 15B, the object of the game is to move a dot 160 either in an up direction as indicated by arrow 161 or in a down direction as indicated by arrow 162. The game is played by two people. One player attempts to move the dot 160 in the up direction and the other in the down direction. The game is won when the dot reaches either an upper or lower limit. This game can be played with suitable overlays such as a picture of a building whereby the dot 160 would represent an elevator where one player would try to take the elevator to the top and the other take it to the bottom. Other suitable overlays may be used. The only controls required by the players are a pair of switches 154 and 155. Player A, for example, will use switch 154 while player B will use switch 155.

The game is played as follows: Initially switch 154 is in the position shown and therefore when the switch is not pressed, capacitor 156 will charge up to the E voltage. When the switch 154 is actuated, the capacitor 156 will discharge through the normally open contact of the switch 154, through a resistor 157 into a capacitor 158. Capacitor 158 is made very much larger than capacitor 156 so that it will hold much more charge. Accordingly, player A by continually "pumping" switch 154 permits capacitor 156 to charge and discharge eventually causing capacitor 158 to fully charge and bring the dot 160 up to its upper limit.

At the other side of the circuit, we see that in the normal condition switch 155 is so placed that capacitor 159 will be completely discharged. By depressing switch 155, capacitor 159 will be charged by removing charge from the capacitor 158 through the resistor 160 and dumping it into the capacitor 159. Accordingly, player A is attempting to charge capacitor 158 while player B is attempting to discharge capacitor 158. When capacitor 158 is fully charged, it will apply position voltage to the vertical controls of dot generator such that the dot will remain at the top of the screen. When capacitor 158 is fully discharged, there will be no voltage supplied to the dot generator; accordingly, the dot generator will be at the bottom of the screen. To start the game the capacitor 158 is initially charged to be in some mid position. The horizontal control voltage applied to the dot generator is a fixed voltage to set the dot 160 in some position in the middle of the screen.

Figure 16:
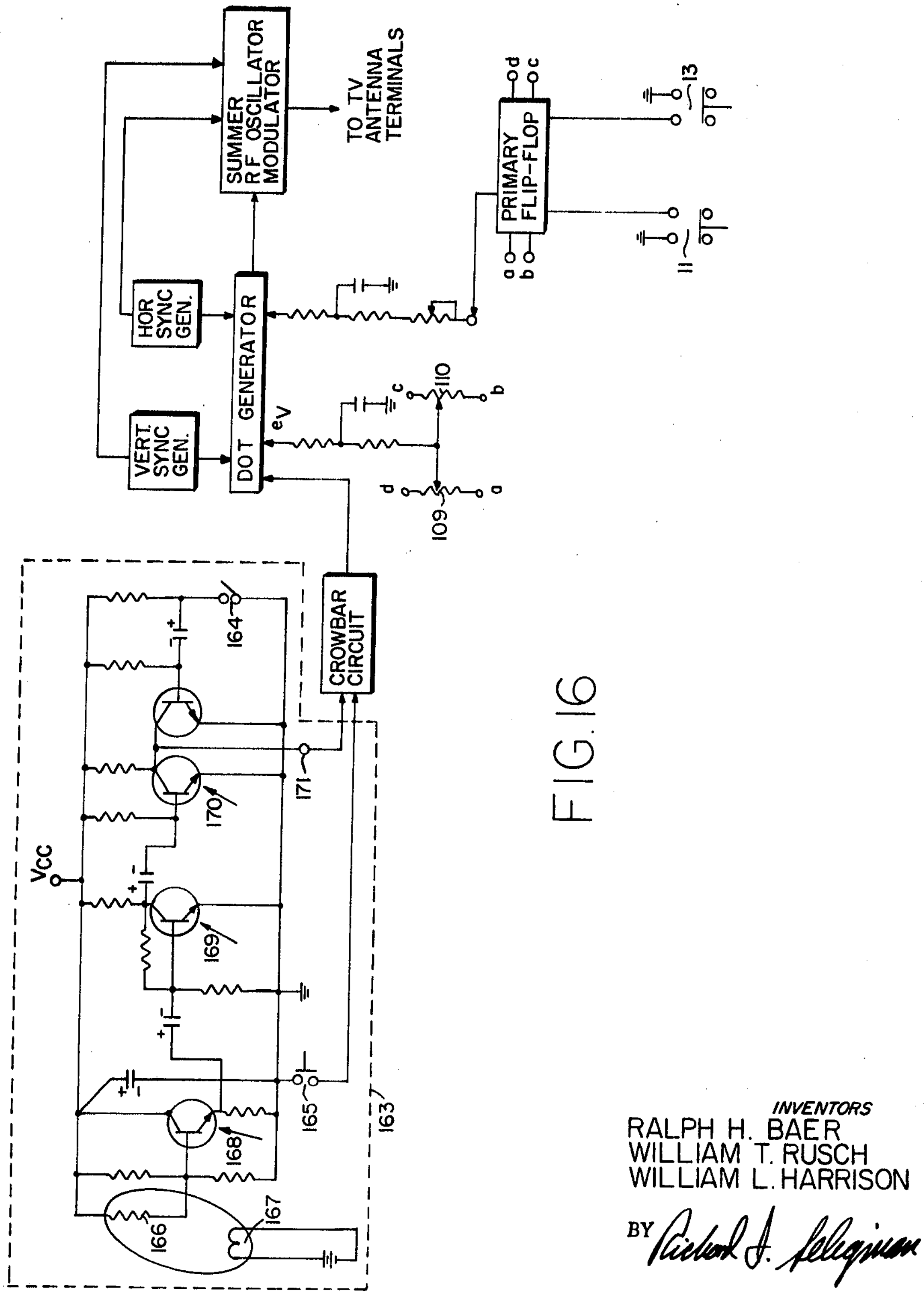
FIG. 16 is a diagram of apparatus for a target shooting game.

Referring now to FIG. 16, there is illustrated another type game which may be played employing some of the devices demonstrated in the earlier figures. This target shooting game employs a simulated gun having electronics built therein. Preferably, the electronics illustrated in the dotted box 163 is built right into the simulated gun , including a trigger 164 and a reset switch 165. Alternatively, the electronics other than a photo cell 166 can be provided elsewhere with cable connections between the photo cell and the other electronics.

In this game, a dot is displayed on the screen and caused to move between off-screen left and off-screen right positions by depressing serve/reset buttons 11 and/or 13. Furthermore, the dot is controlled by the player not doing the target shooting by manipulation of the potentiometers 109, 110. Alternatively, only a single potentiometer can be applied to the vertical control for the dot generator such that no switching between potentiometers is required and therefore the player not doing the shooting can control the potentiometer for a number of horizontal scans without switching between two potentiometers.

The photo cell 166 is biased by a lamp 167. This makes the photo cell much more sensitive and permits the shooter to remain at a greater distance from the screen of the TV receiver. The output of the photo cell is applied via an emitter follower 168 to an amplifier 169. The output from amplifier 169 is applied to an amplifier 170 which is just saturated until turned off by a signal from the output of the photo cell. Trigger 164 is connected to the amplifier with appropriate time constants such that an output via line 171 will occur only during a very short time, that is, you must find the dot, shoot at it, and if a score is to be recorded, it must occur at the time that you shoot at the dot, that is, when you depress the trigger. Because of the short time constant, you cannot merely hold the trigger down and move the rifle around in an attempt to line up with the dot. The output 170 is applied to a crowbar circuit which has an output to the dot generator. The crowbar circuit thereby shorting the output from the dot generator in the manner previously described, causing the dot to disappear from the screen of the television receiver. Reset button 165 is provided to ground the anode of the SCR within the crowbar circuit whereby the dot will reappear after release of the reset button.

All of the symbol generation techniques and various games described hereinbefore and hereinafter may be carried out or played in conjunction with either monochrome or color television receivers. For color receiver applications, a chroma generator is provided.

Figure 17:
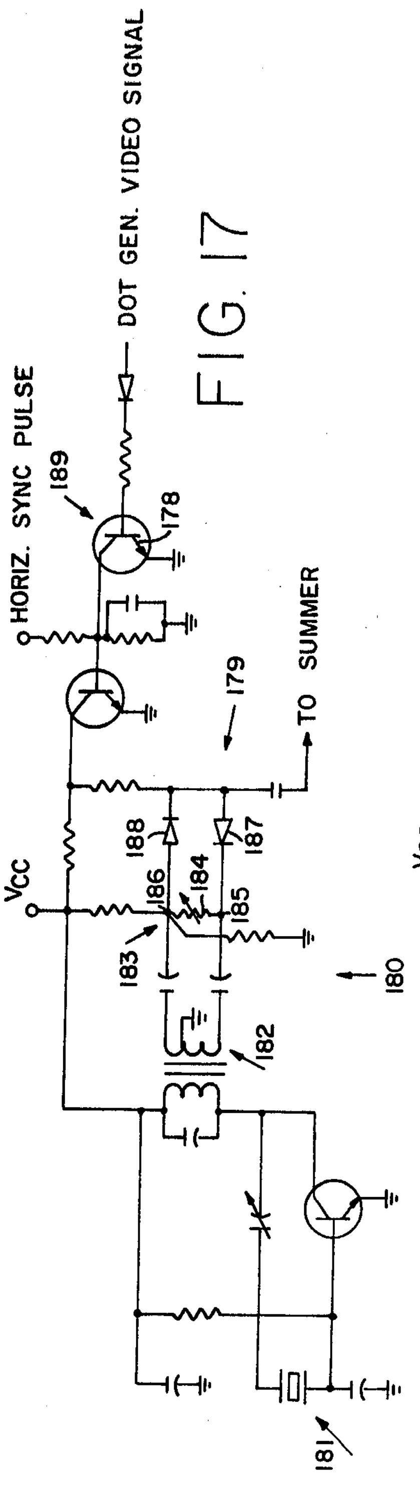
FIG. 17 is a schematic of a chroma signal generator.

A typical chrome generator arrangement is illustrated in FIG. 17. Chroma generator 180 comprises a crystal-controlled oscillator 181, a phase splitter 182, a phase shifter 183, and a gate 179. By varying a resistor 184 (turning knob 15 of FIG. 1) the phase shift between the signals at a point 185 and a point 186 can be varied by nearly 180°. The signal at point 185 is the chroma reference signal and the signal at point 186 is the chroma signal. During generation time of the sync pulses or flyback time, the signal output of chroma generator 180 is taken at the anode of a diode 187 and applied to the summer of the summer, modulator and RF oscillator. This chroma reference signal will lock the demodulator reference signal of the television receiver in phase. During trace time, the signal from the chroma generator is derived at the cathode of a diode 188. This signal, likewise, is applied to the summer, and provides a background color dependent upon the setting of phase shifter 183.

If it is desired to have colored dots displayed on the screen, then an OR gate 189 is employed to couple both the horizontal sync pulses and dot generator video signals to the chroma generator whereby the video signal entering the chroma generator will cause the particular dot displayed to have a particular color coincident with phase zero, phase zero being the reference burst. A transistor 178 is employed to invert the video signal. The other dot or dots will be white unless their video signal is also coupled to this point. However, if it is desired to have more than one dot of a color other than white, then the phase splitter 182 must be tapped to split the signals into more than two phases and additional phase shifters must be incorporated, whereby more than two signals of different phase can be generated. Other circuitry also would be required. In the television receiver, the chroma signal is compared to the chroma sync burst or reference signal and the phase difference between the two signals determines the color to be displayed on the screen. Chroma signals can be added to the total input to the TV receiver when, for example, dots of different colors are to be displayed or, for example, when it is desired that background changes color upon the occurrence of a particular event as, for example, in a shooting game, when a target is hit, as well as for many other events.

Figures 18A, 18B:
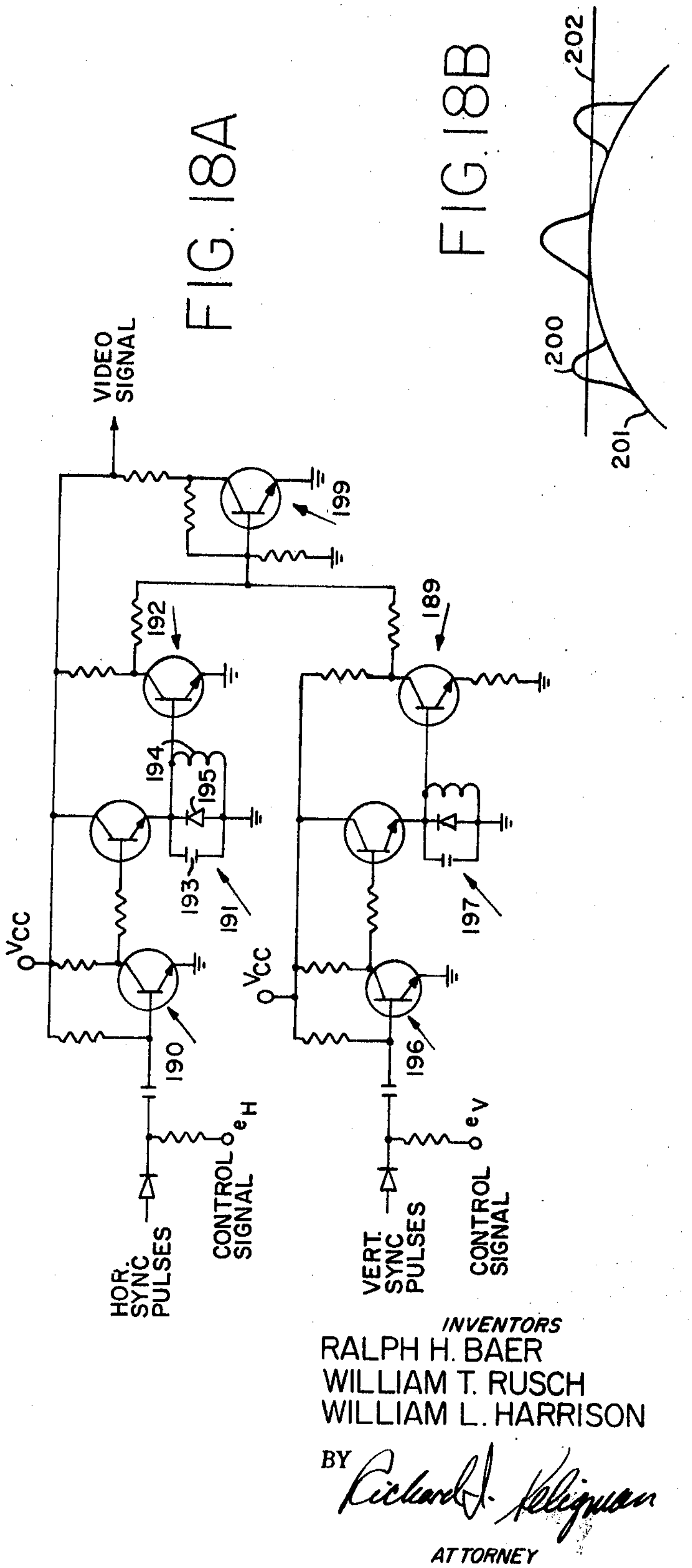
FIG. 18A is a schematic of another embodiment of a dot generator.
FIG. 18B is a sketch of illustrative video signals of the dot generator of FIG. 18A.

The dots employed in the embodiments illustrated hereinbefore have been squares, however, other configurations can be generated by making minor changes to the dot generators. FIG. 18A illustrates a dot generator for generating round dots which might in some application be more aethetically pleasing. Like the dot generator of FIG. 7, the dot generator of FIG. 18A comprises two sections — a horizontal section for providing the horizontal portion of the video signal, and a vertical section for providing the vertical portion of the video signal. The horizontal section comprises a delay circuit 190 which provides the horizontal positioning of the horizontal portion of the video signal; that is, at what place horizontally on the television screen will the generated symbol appear. The horizontal section further comprises a ringing circuit 191 and a second delay circuit 192. The ringing circuit 191, in effect, shapes the horizontal sync pulses delayed by the circuit 190 into half sine waves. The ringing circuit 191 comprises a capacitor 193, an inductor 194, and a diode 195. The diode 195 limits the ringing circuit output to approximately one half cycle. The output of the ringing circuit is applied to delay circuit 192 which determines the size of the generated symbol. The vertical portion of the dot generator is construted in the same manner as the horizontal portion and comprises a first delay circuit 196, a ringing circuit 197, and a second delay circuit 198. The outputs from the delay circuits 192 and 198 are tied together and applied to a threshold circuit 199. The video signal output from the threshold circuit is applied to an OR gate and summer, rf oscillator, and modulator as set forth hereinbefore in FIG. 5.

FIG. 18B is a sketch illustrating the outputs of the circuit of FIG. 18A. This sketch is not to scale, but only used to illustrate the manner of generation of the output signal. The horizontal pulses 200 taken at the output of circuit 192 ride upon vertical pulses 201 taken at the output of circuit 198. The threshold circuit permits only those pulses above the threshold level indicated by dotted line 202 to pass. Accordingly, the video signal pulses will be of different widths, depending upon the amount of horizontal pulse signal exceeding the threshold 202. As can be seen from FIG. 18B, the width of the leftmost pulse will certainly be much less than the width of the pulse in the center, thus providing the greatest width of the symbol to be in the center thereof and the least width to occur at the portion closest to the top and bottom edges of the screen. As will be ready apparent, this will describe a round symbol.

Previously, we have described dots which are controlled by participants. Dots can also be generated which are controlled solely by the position and velocity of a participant controlled dot. This latter dot is designated as a "hitting" dot and the newly described dot is designated as a "hit" dot. The "hit" dot simulates a ball, a hockey puck, etc. A "hitting" dot simulates a paddle, a hockey stick, a golf club, a hand, etc.

Figure 19A:
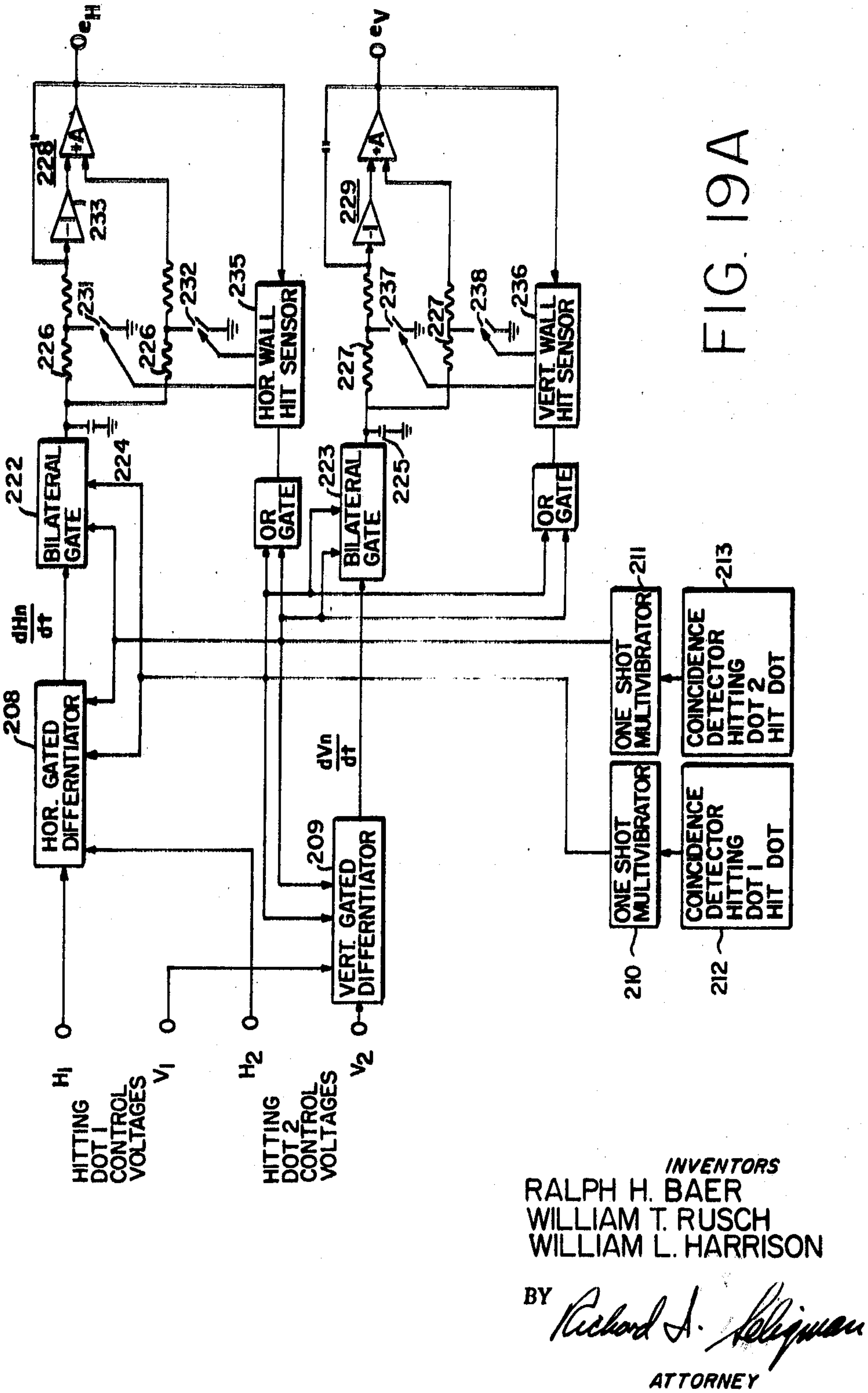
FIG. 19A is a block diagram of apparatus for controlling a "hit" dot.
Figure 19C:
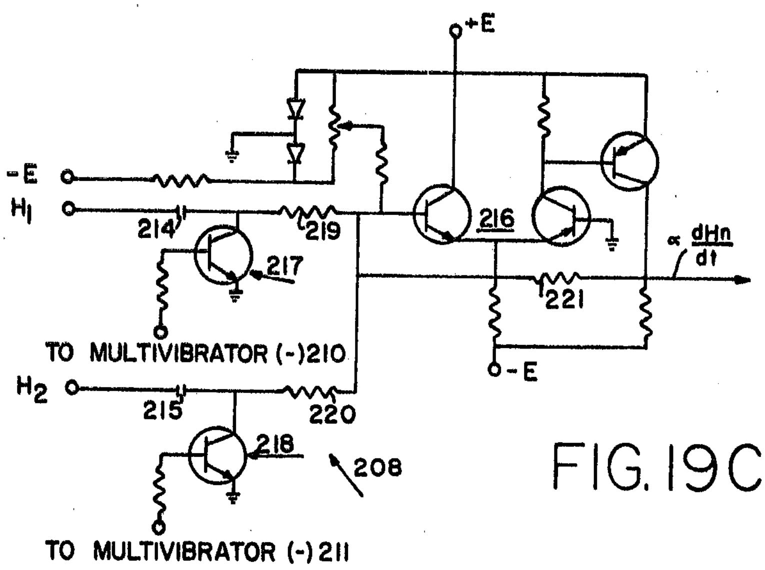
FIG. 19C is a schematic of the horizontal gated differentiator of FIG. 19A.
Figure 19B:
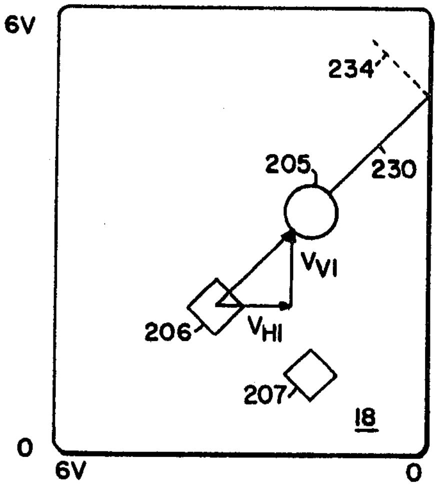
FIG. 19B is a sketch illustrating the manner in which the apparatus of FIG. 19A controls a "hit" dot.

The manner of generating "hit" dots is set forth in FIGS. 19A–19D. The $e_H$ and $e_V$ spot positioning voltages for a "hit" dot such as dot 205 in FIG. 19B are generated by these circuits. These voltages, the outputs of the circuit of FIG. 19A, are applied to the horizontal and vertical control signal points of the "hit" dot generator, such as point 48 of FIG. 7. The inputs of the circuit of FIG. 19A are the control voltages of a "-hitting" dot, for example, dot 206 or dot 207 of FIG. 19B. The embodiment shown is for applications having two hitting dots which could represent, for example, two hockey sticks in a simulated hockey game.

The "hitting" dots' horizontal control voltages are applied to a horizontal gated differentiator 85 and the "hitting" dots' vertical control voltages are applied to a vertical gated differentiator 209. Each of the gated differentiators has as further inputs thereto outputs from a pair of one shot multivibrators 210, 211. The multivibrators 210, 211 are triggered by outputs from a pair of coincidence detectors 212, 213, respectively. Coincidence detector 212 signifies coincidence between a first "hitting" dot, for example, dot 206, and the "-hit" dot, for example, dot 205. Coincidence detector 213 signifies coincidence between a second "hitting" dot, for example, dot 207 and the "hit" dot. Coincidence detector circuits are illustrated hereinabove.

The gated differentiators 208, 209 provide pulses whose amplitudes are proportional to the horizontal and vertical components of the velocity of the "hitting" dot at the instant of contact between the "hitting" and "hit" dots. The pulse width is that of the pulses from the one shot multivibrators 210, 211. Accordingly, this causes the "hit" dot to travel in the direction from which it was hit and at a speed proportional to how "hard" it was hit.

A preferred embodiment of horizontal gated differentiator 208 is shown in FIG. 19C. Vertical gated differentiator 209 is constructed in like fashion. The differentiator is comprised of capacitors 214 and 215 and feedback amplifier 216. The input signals $H_1$ and $H_2$ are coupled to the differentiator. A pair of switches, 217 and 218, follow the differentiating capacitors, 214 and 215. The switches 217, 218 are normally closed. One or the other is opened by a signal from either multivibrator 210 or 211 allowing the differentiator to differentiate the input signal of the dot which makes coincidence with the "hit" dot. The resistors 219, 220 prevent shorting to ground of the desired signal when the other signal switch 218 or 217 is closed. Resistor 221 is the differentiating feedback resistor. The output pulse of this circuit can be positive or negative depending upon the direction of the "hitting" dot when it coincides with the "hit" dot. Using the preferred gated differentiator of FIG. 19C, undesirable overshoots and preshoots are avoided since the switching is accomplished following the differentiating capacitors rather than before them.

Refer again to FIG. 19A. To provide the control voltages for the "hit" dot, the signal *dHn/dt* must be integrated for a period of time. If the signal is integrated for a period of time equivalent to the relatively short pulse width of the one shot multivibrators, the "hit" dot would move only during this time and this is too fast a spot movement. Accordingly, it is desirable to "stretch" the time of spot movement, by for example, providing an RC delay to the *dHn/dt* signal. This would be a simple matter if *dHn/dt* and *dVn/dt* were always one polarity. However, since *dHn/dt* and *dVn/dt* can be either polarity a more complex arrangement is necessary.

When either "hitting" dot makes coincidence with the "hit" dot a coincidence pulse from multivibrators 210 or 211 allows the bilateral gates 222 and 223 to pass positive or negative *dHn/dt* and *dVn/dt* pulses to stretching capacitors 224 and 225 respectively. After the coincidence pulse ends, the bilateral gates return to their open or high impedance state and the voltage on capacitors 224 and 225 decay at a rate determined by the capacitors and resistors 226 and 227.

The stretched pulses at capacitors 224 and 225 are coupled to integrators 228 and 229. The outputs of the integrators are voltages $e_H$ and $e_V$. These voltages become the control voltages for the "hit" dot.

The resultant effect is that the "hit" dot moves in the same direction in which the "hitting" dot is moving when coincidence is made. If hit "hard," the "hit" dot moves rapidly and far. If the "hitting" dot is moving slowly at coincidence, the "hit" dot is merely "nudged" a short distance and moves slowly.

In the embodiment illustrated, a wall-bounce feature is included. When the "hit" dot is to travel, for example, along the line 230 (see FIG. 19B), switch 231 is open and switch 232 is closed and the signal bypasses on inverter 233. When the "hit" dot reaches the edge of the TV screen, it is desired that it "bounce" back as shown by line 234 of FIG. 19B, simulating, for example, a puck bouncing off the wall of a rink in a simulated hockey game or a billiard ball bouncing from a cushion. The "hit" dot bounces from the sides of the screen with a reflection angle equal to the incidence angle. When the dot reaches the edge of the screen, switch 231 closes and 232 opens. The signal from the bilateral gate is thus now applied to the integrator via an amplifier. A horizontal or vertical wall sensor 235, 236 as the case may be, provides the requisite signal to cause the switching of switches 231, 232 and 237, 238.

Note, in the event the wall bounce feature is not required, the horizontal system of FIG. 19A may be modified by deleting switches 231, 232 inverter 233 and the horizontal wall hit sensor 235, like components also being deleted from the vertical system.

Figure 19D:
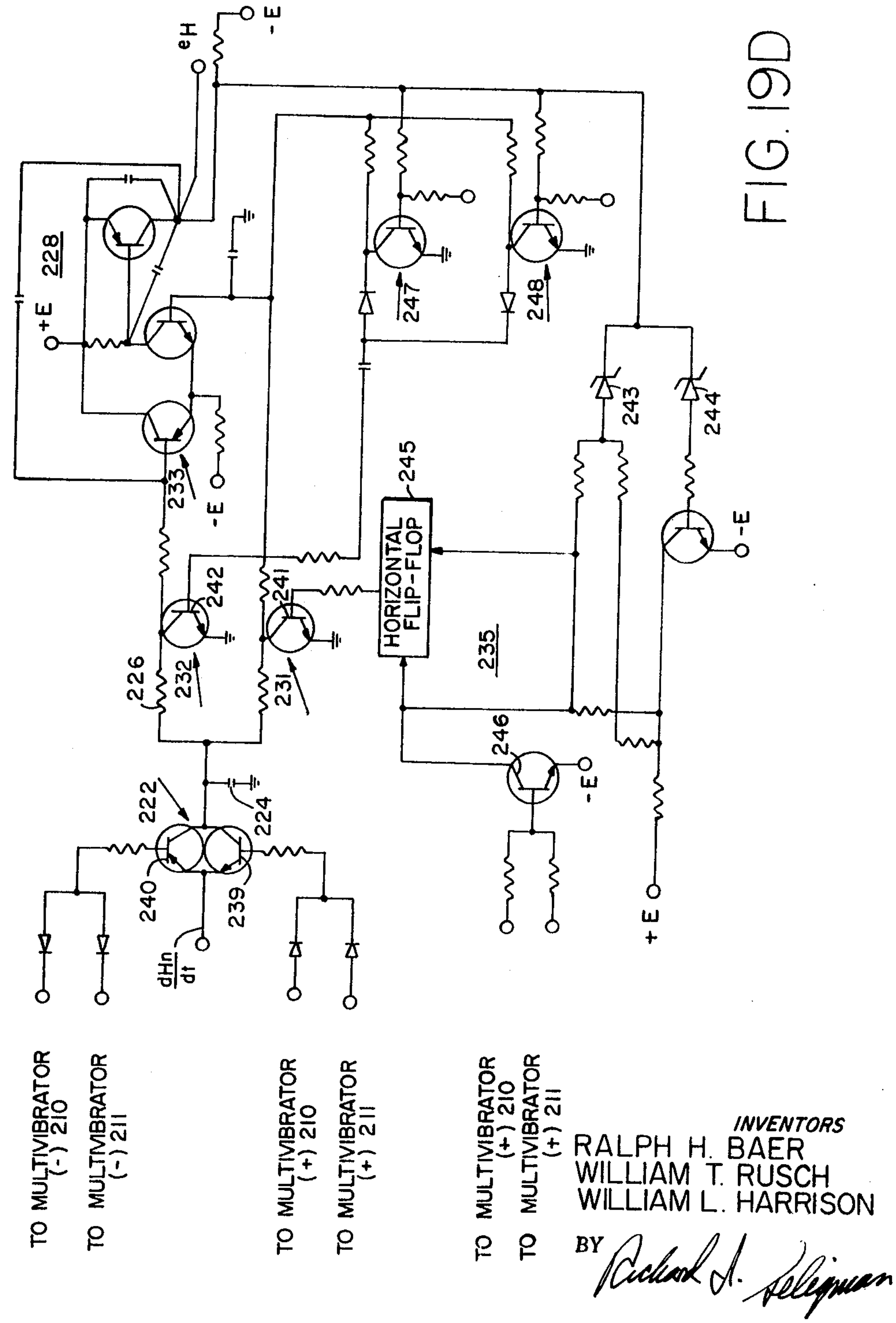
FIG. 19D is a schematic of the bilateral switch, integrator and wall bounce of FIG. 19A.

The bilateral gate 222, integrator 228 and horizontal wall bounce circuitry is shown in greater detail in FIG. 19D. Like circuitry is also provided for the vertical portion of the system.

The differentiated signal pulse *dHn/dt* is applied to bilateral gate 222 which is comprised of a pair of transistors 239, 240. Signals indicative of coincidence between a "hitting" and "hit" dot are obtained from the two sides of the coincidence multivibrators and are applied to the base of the transistors as shown, negative pulses turning 240 on and positive pulses turning 239 on. The switches 231, 232 of FIG. 19A are comprised of transistors 241, 242, respectively. The output "hitting" dot control signal $e_H$ is obtained at the output of integrator 228.

The output from integrator 228 is also applied to horizontal wall hit sensor 235 which comprises a pair of zener diodes 243, 244 which cause the switching of a flip-flop 245 when voltage is reached equivalent to off-screen voltage (for example, 0 volts or +6 volts). Initially, flip-flop 245 is set to a given state upon coincidence between either "hitting" dot and the "hit" dot by an output from transistor 246 to insure correct direction of the "hit" dot. If the flip-flop were in the wrong state, the "hit" dot would move 180° from the desired direction.

The circuits 247 and 248 are provided to prevent oscillation of the flip-flop 245 and failure to flip correctly which can occur if the "hit" dot approaches an off-screen position very slowly such that only a poor rise time signal is available to trigger the flip-flop.

With the additional feature of the hit spot and wall bounce as set forth in FIGS. 19A through 19D, other classes of games than those previously set forth can be played. Many of these games are set forth in said U.S. Pat. Application, Ser. No. 828,154. One such game is a simulated hockey game wherein a pair of dot generators represent the players in the manner previously taught, and a third dot generator represents the puck. The first and second dot generators would receive their dot position control voltages from controls coupled to both the horizontal and vertical positioning potentiometers. The third dot generator, which generates the puck symbol receives its horizontal and vertical positioning controls from a "hit" dot with wall bounce system of the type set forth in FIGS. 19A through 19D, whereby the position of the puck and travel of the puck depends upon which of the two players' dot hit the puck and from what direction. Said U.S. Pat. Application Ser. No. 828,154 also illustrates other games such as a simulated handball game which may be played using controlled hit dots and wall bounce features. It is obvious, of course, that any of the well known games wherein a player hits a ball and that ball is to travel at a speed and in the direction which hit can be simulated for TV gaming using the methods and principles taught within this application. The primary difference between these games over those set forth in said Application No. 828,154 is that the unique dot generators are employed whereby square dots are generated as described with respect to FIG. 7 or round dots as described with respect to FIG. 18.

There is another unique display function which can be generated using a modification of the dot generator illustrated in FIG. 7. This modification is shown in FIG. 20B. The modification comprises deleting the resistor 51 of FIG. 7, and the corresponding resistor for the vertical portion of the dot generator, and adding new resistors 250 and 251 coupling the base of transistors 52 and 53 to their respective control signal inputs. By making this modification, the size of the displayed dots will be dependent upon the control signal inputs, that is, the positioning inputs, hence the size of the displayed dots will be dependent upon where on the screen they are displayed.

There are many applications for this type of function. One such application is set forth in FIGS. 20A and 20C, and comprises a realistic race game. The object of this game is to move or race dots about an obstacle 252. A pair of dots 253 and 254 race about the obstacle dot 252. As the dots move about the obstacle, they change in size, generally getting smaller as they get further away from the starting position. Thus, as the dots turn the corner at the lower right hand side of the screen 18, they will appear as dots 255 and 256; as they near the upper right hand corner of the screen, they appear as dots 257 and 258. At the upper left hand corner of the screen 18, they appear as dots 259 and 260.

Figure 20A:
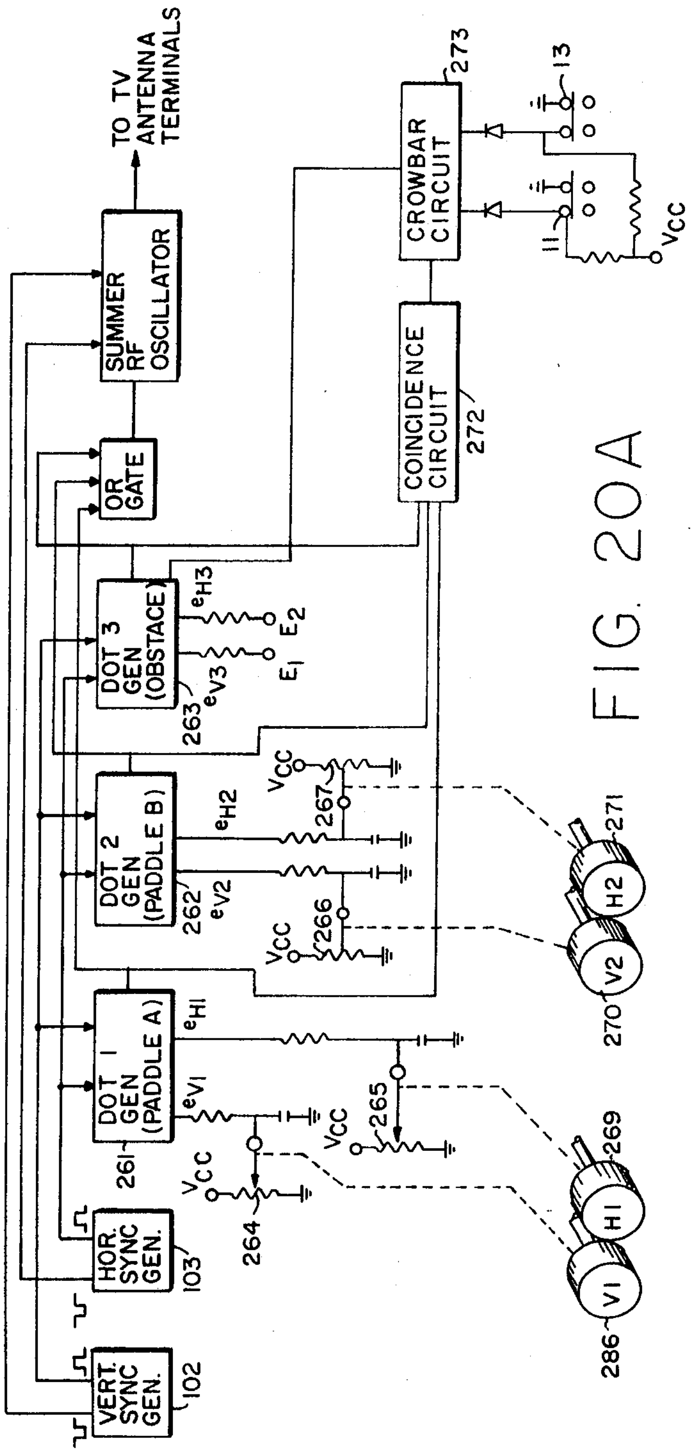
FIG. 20A is a diagram of electronic apparatus for a simulated race game.
Figure 20C:
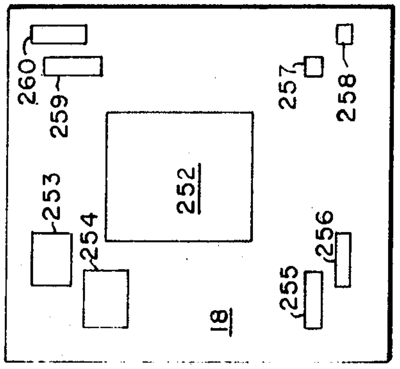
FIG. 20C is a sketch of a television screen illustrating the manner of play of the race game of FIG. 20A.
Figure 20B:
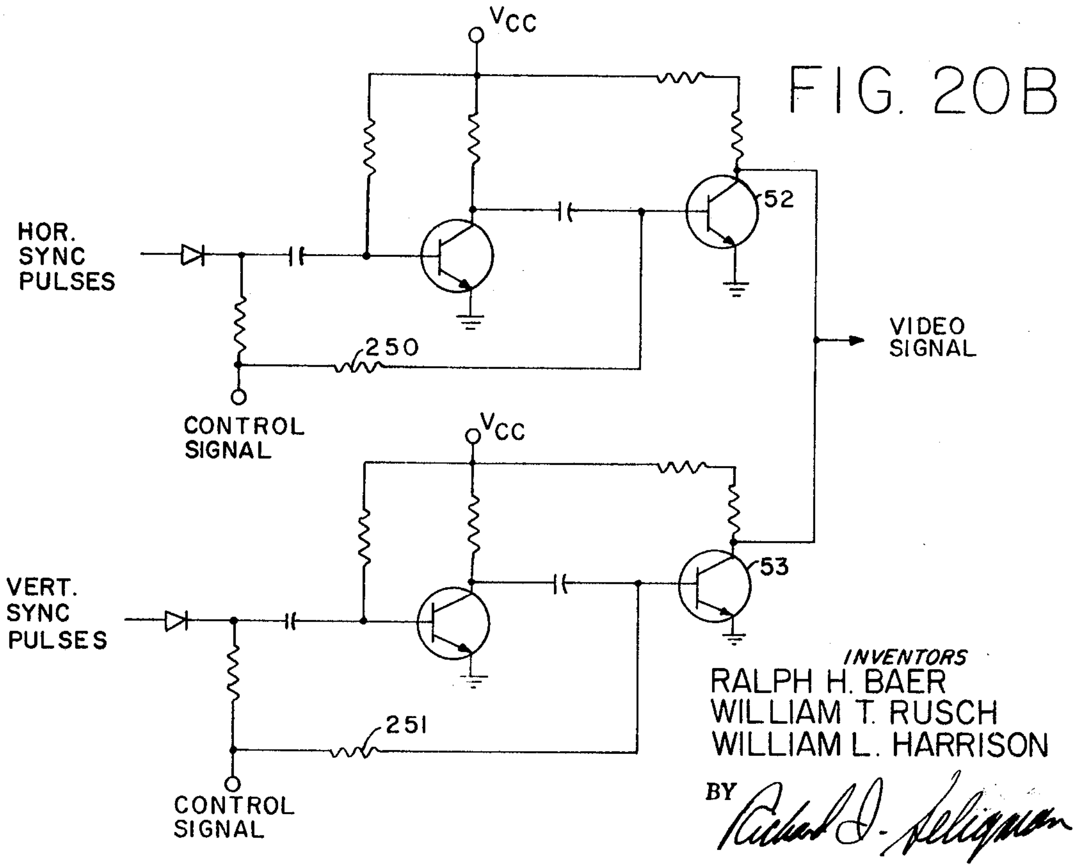
FIG. 20B is a schematic of a dot generator having position controlled dot size.

FIG. 20A is a block diagram of the system for carrying out the race type game of FIG. 20C. A pair of dot generators 261 and 262 generate video signals which are coupled to a television receiver to display the dots 253 through 260. These dot generators are constructed in the modified form of FIG. 20B whereby size of the dots is dependent upon the positioning control signal applied to the generators. The dot generators 261 and 262 have as inputs thereto the positive sync pulses from sync generators 102 and 103. A third dot generator 263 is constructed in the conventional manner as set forth in FIG. 7, having DC voltages as the control inputs thereto and generates the obstacle 252. This generator also has inputs from the vertical and horizontal sync generators 102 and 103.

The outputs from the three dot generators are applied to an OR gate whose output is in turn applied to the summer, RF oscillator and modulator, which also receives the negative sync pulses from the sync generators 102 and 103. The output from the summer, RF oscillator and modulator is applied to the TV antenna terminals in conventional fashion. The control signals to the DOT 1 and DOT 2 generators, 261 and 262 are derived from potentiometers 264, 265, 266 and 267, respectively. These potentiometers are operated by knobs 268 through 271. In an alternate embodiment, the knobs 268, 269 and 270, 271 can be replaced by a joystick control, one control being coupled to the vertical and horizontal potentiometers of each dot generator.

The outputs from the dot generators are applied to a coincidence circuit of the type previously set forth. The output from the coincidence circuit is applied to a crowbar circuit 273, whose output is applied to the DOT 3 generator 263 to cause the displayed dot 252 to disappear upon coincidence between either of the dots from dot generator 1 or 2 and the DOT 3 (obstacle). Serve/reset switches 11 or 13 reset the crowbar circuit causing the DOT 3 obstacle to reappear in the manner previously set forth.

In an alternate embodiment, the background color of the screen can be made to change color upon coincidence between DOT 1 or DOT 2 and DOT 3.

This is only one application for changing spot size by position control, and many applications will be readily apparent to the reader, for example, in a target shooting game, the target can be caused to change size at different portions of the screen whereby higher or lower scores will be awarded for hitting a target depending upon the size thereof.

Figure 21:
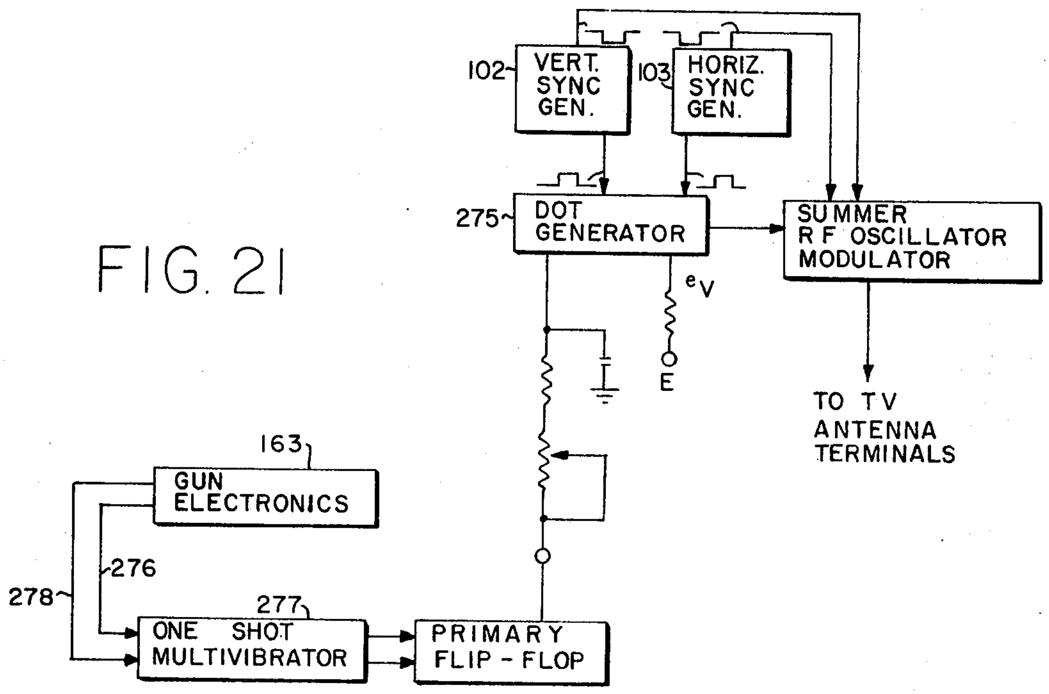
FIG. 21 is a diagram of electronic apparatus for a left-right shooting game.

Another game which makes use of the rifle electronics described hereinbefore with respect to the system of FIG. 16 is what is designated as the left-right rifle shoot, and comprises displaying a dot on the screen, which will move from a first off-screen position to a second off-screen position. However, if the dot when moving from one off-screen position to the other is detected by the photo cell of rifle electronics, the dot will reverse direction and move toward the opposite off-screen position. This will happen as many times as the dot is detected by the rifle electronics photo cell; that is, by aiming, "shooting" and "hitting" the dot, you can turn its direction as many times as you "hit" the dot. If you do not hit the dot, it will go off screen and remain their until reset. This system is illustrated in detail in FIG. 21.

A dot generator 275 constructed in the fashion previously taught for displaying either a round or square dot generates the target dot on the screen of the television receiver. The vertical position of the dot is fixed by a voltage E applied to the vertical control of the dot generator. Voltage E can vary anywhere from 0 to 6 volts, depending on the desired position of the dot preferably, it would be 3 volts to place the dot within the center of the screen. The dot generator 275 receives its inputs from vertical and horizontal sync generators 102 and 103. The video output of the dot generator 275 is applied to a summer, RF oscillator and modulator along with negative sync pulses from the sync generators 102 and 103, with the output of the summer RF oscillator and modulator applied to the TV antenna terminals.

Horizontal positioning control for dot generator 275 is derived from a primary flip-flop of the type set forth in FIG. 9. The primary flip-flop will cause the dot to move from off-screen left to off-screen right and vice versa. This voltage is applied through an RC time constant to slow the dot down. The game is played by aiming a gun at the dot displayed on the television receiver and pressing a trigger thereon in the manner taught with respect to the system of FIG. 16. If the dot is detected, an output 276 is applied to a monostable multivibrator 277, which causes the primary flip-flop to change states, thereby changing horizontal direction of the dot. If the dot is not "hit" during its traverse across the screen, then it will go off-screen and remain there until reset. To reset the system, a switch 165 (see FIG. 16) is pressed, which grounds the monostable multivibrator along line 278, thereby applying a signal to the primary flip-flop.

Variations of this game may be played by, for example, not having the vertical control voltage be a fixed voltage, but by using "English" potentiometers in the manner previously taught in FIG. 16, selection of which potentiometer would be in the circuit being defined by the state of the primary flip-flop as previously set forth.

The many games and techniques described herein are only illustrative of the games and techniques which can be carried out by the apparatus and methods set forth. Other games and techniques can be carried out in the manner set forth in said application, Ser. No. 126,966 and 828,154. For example, the present invention can be used in conjunction with broadcast programs, overlays etc. in the manner set forth in said U.S. Pat. Application Ser. No. 126,966. The present invention can be used to generate bars and checkerboard patterns in the manner set forth in said Application, Ser. No. 828,154. The baseball games, hockey games, ping-pong games, bowling games, billiard games, etc. as set forth in said application Ser. No. 828,154 all can be played using the apparatus set forth herein.

The arrangement of the apparatus itself also can be changed in the manner set forth in said Application, Ser. No. 828,154. For example, the dot generating apparatus can be built right into the television set rather than be a separate unit. The dot generation apparatus can be wired into the television set itself rather than merely being connected to the antenna terminals thereof. The output of the summer can be applied to the video amplifier directly eliminating the need for a modulator and a RF oscillator. This can be applied via a switch, switching between the conventional video detector and the output of the summer so that the television can either be used in the gaming mode or conventional viewing mode. These are all shown in said Application, Ser. No. 828,154. Sync signals can be received from a broadcast station rather than provide separate sync signals. A television receiver can be made just for television gaming in the manner set forth in said Application, Ser. No. 828,154, whereby the output of the OR gate would be applied to a video amplifier to intensity modulate a cathode ray tube, the output of the horizontal and vertical sync generators being applied to the horizontal and vertical deflection circuitry.

All of the games herein set forth and others can be built into a single chassis with various selected portions of the entire circuitry selected by switches mounted on the chassis, or external wiring portions of circuit (interconnections) or various programs such as separate printed circuit boards having appropriate lands for a selected game, connectors having appropriate pins tied together, punch cards used in conjunction with said external wiring, etc.

Thus, it is to be understood that the embodiments shown are illustrative only, and that many variations and modifications may be made without departing from the principles of the invention herein disclosed and defined by the appended claims.

We claim:

1. In combination with a standard television receiver, apparatus for generating signals representing a first and second "hitting" symbol and a "hit" symbol to be displayed on the screen of said television receiver, comprising:

means for generating horizontal and vertical sync signals;
means for generating a vertical train of square pulses;
means for generating a horizontal train of square pulses;
a first "hitting" symbol generator;
a second "hitting" symbol generator;
a "hit" symbol generator;
means for applying said vertical and horizontal trains of square pulses to said symbol generators;
means for generating first and second control signals for said first "hitting" symbol generator;
means for coupling said first and second control signals to said first "hitting" symbol generator;
means for generating third and fourth control signals for said second "hitting" symbol generator;
means for coupling said third and fourth control signals to said second "hitting" symbol generator;
means for generating fifth and sixth control signals for said "hit" symbol generator;
means for coupling said fifth and sixth control signal to said "hitting" symbol generator;
means for coupling said first, second, third and fourth control signals to said means for generating fifth and sixth control signals; and
means for coupling the outputs of said symbol generators and said sync signals to the television receiver.

2. In combination with a standard television receiver, apparatus for generating symbols upon the screen of the receiver to be manipulated by at least one participant, comprising:
means for generating a "hitting" symbol;
means for generating a movable "hit" symbol;
means for generating a fixed "hit" symbol;
means for denoting coincidence between said movable "-hit" symbol and said "hit" fixed symbol;
means for causing said movable "hit" symbol to move away from said fixed "hit" symbol when coincident therewith; and
means for displaying said symbols.

3. Apparatus for playing volleyball type games by displaying and manipulating symbols on the screen of a cathode ray tube, comprising:
means for generating a first "hitting" dot;
means for generating a second "hitting" dot;
means for generating a "hit" dot;
means for generating a "net" symbol;
means for changing the vertical position of said first "-hitting" dot;
means for changing the vertical position of said second "-hitting" dot;
means for causing said "hit" dot to move from an off-screen left position of an off-screen right position and vice versa;
means for changing said off-screen right and off-screen left positions;
means for denoting coincidence between either of said "-hitting" dots and said "hit" dot;
means for causing said "hit" dot to change horizontal direction upon coincidence between said "hit" dot and either of said "hitting" dot;
means for denoting coincidence between said "hit" dot and said "net" symbol; and
means for displaying said dots upon the screen of said cathode ray tube.

4. Apparatus for playing volleyball type games is defined in claim 3, further including means for causing said "hit" dot to disappear upon coincidence between said "hit" dot and said "net" symbol.

5. Apparatus for generating signals representing a first and second "hitting" symbol and a "hit" symbol to be displayed on the screen of a television receiver, comprising:
means for generating horizontal and vertical sync signals;
means for generating a vertical train of square pulses;
means for generating a horizontal train of square pulses;
a first "hitting" symbol generator;
a second "hitting" symbol generator;
a "hit" symbol generator;
means for applying said vertical and horizontal trains of square pulses to said symbol generators;
means for generating first and second control signals for said first "hitting" symbol generator;
means for coupling said first and second control signals to said first "hitting" symbol generator;
means for generating third and fourth control signals for said second "hitting" symbol generator;
means for coupling said third and fourth control signals to said second "hitting" symbol generator;
means for generating fifth and sixth control signals for said "hit" symbol generator;
means for coupling said fifth and sixth control signals to said "hit" symbol generator;
means for coupling said first, second, third and fourth control signals to said means for generating fifth and sixth control signals; and
means for coupling the outputs of said symbol generators and said sync signals to a television receiver.

6. Apparatus for generating symbols on the screen of a television receiver to be manipulated by at least one participant, comprising:
means for generating a "hitting" symbol;
means for generating a movable "hit" symbol;
means for generating a fixed "hit" symbol;
means for denoting coincidence between said movable "-hit" symbol and said first "hit" symbol;
means for causing said movable "hit" symbol to move away from said fixed "hit" symbol when coincident therewith; and
means for coupling said generated symbols to a television receiver.

7. Apparatus for playing handball type games by displaying and manipulating symbols on the screen of a cathode ray tube, comprising:
means for generating a first "hitting" dot;
means for generating a "second" hitting dot;
means for generating a "hit" dot;
means for generating a wall symbol;
means for changing the vertical position of said first "-hitting" dot;
means for changing the vertical position of said second "-hitting" dot;
means for causing said hit dot to move off-screen away from said wall dot when coincidence is not made between eight of said "hitting" dots and said "hit" dot;
means for changing said off-screen position;
means for denoting coincidence between said first "hitting" dot and said "hit" dot;
means for denoting coincidence between said second "-hitting" dot and said "hit" dot;
means for causing said "hit" dot to change horizontal direction upon coincidence between said "hit" dot and either of said "hitting" dots;
means for denoting coincidence between said "hit" dot and said wall symbol;
means for causing said "hit" dot to change horizontal direction upon coincidence between said "hit" dot and said wall symbol; and
means for displaying said dots upon the screen of said cathode ray tube.

8. Apparatus for playing a target shooting game on the screen of a cathode ray tube, comprising:
means for generating a target on the screen of said cathode ray tube;
means responsive to said target displayed on said cathode ray tube for "shooting" at said target;
means for causing said target to move in a predetermined direction;
means for causing said target to reverse direction upon hitting of said target by said means responsive;
means for causing said target to go off-screen when not hit by said means responsive during a traverse across the screen.

9. Apparatus as defined in claim 8, wherein said means responsive includes a photosensitive element and means for biasing said photosensitive element.

10. Apparatus as defined in claim 9, wherein said biasing means includes a lamp.

11. Apparatus for playing a target shooting game on the screen of a cathode ray tube, comprising:

means for generating a target on the screen of said cathode ray tube;

means responsive to said target displayed on said cathode ray tube for "shooting" at said target from a distance, including a biased photosensitive element; and means for causing said target to disappear when a hit is made.

12. Apparatus as defined in claim 11, wherein said photosensitive element is biased by a lamp.

* * * * *

PO-1050
(5/69)

UNITED STATES PATENT OFFICE
CERTIFICATE OF CORRECTION

Patent No. 3,659,285 Dated April 25, 1972

Inventor(s) Ralph H. Baer, et al

It is certified that error appears in the above-identified patent and that said Letters Patent are hereby corrected as shown below:

| | |
|---|---|
| Column 7, line 4 | the word "typing" should read --tying--. |
| Column 7, line 16 | the word "there" should read --their--. |
| Column 10, line 32 | the word "their" should read --there--. |
| Column 10, line 64 | the word --of-- should be inserted after the word "one". |
| Column 13, line 7 | the word "aethetically" should read --asthetically--. |
| Column 14, line 35 | the word "ready" should read --readily--. |
| Column 14, line 50 | the word "of" (first occurrence) should read --to--. |
| Column 19, line 20 | the word "hitting" should read --"hit"--. |
| Column 19, line 63 | the word "is" should read --as--. |
| Column 20, line 27 | the word "first" should read --fixed--. |
| Column 20, line 46 | the word "eight" should read --either--. |

Signed and sealed this 15th day of May 1973.

(SEAL)
Attest:

EDWARD M.FLETCHER,JR.
Attesting Officer

ROBERT GOTTSCHALK
Commissioner of Patents

Disclaimer 3,659,285.—*Ralph H. Baer*, Manchester, *William T. Rusch*, Hollis, and *William L. Harrison*, Nashua, N.H. TELEVISION GAMING APPARATUS AND METHOD. Patent dated Apr. 25, 1972. Disclaimer filed Apr. 17, 1978, by the assignee, *Sanders Associates, Inc.*

Hereby enters this disclaimer to claims 1, 2, 5 and 6 of said patent.

[*Official Gazette June 13, 1978.*]